United States Patent
Nishiyama et al.

(10) Patent No.: US 7,454,962 B2
(45) Date of Patent: Nov. 25, 2008

(54) FUEL CONSUMPTION EVALUATION SYSTEM

(75) Inventors: Yoshitaka Nishiyama, Ageo (JP); Masaru Yamashita, Ageo (JP); Hiroshi Miyake, Ageo (JP); Akira Nakamura, Ageo (JP)

(73) Assignee: Nissan Diesel Motor Co., Ltd., Ageo-Shi (JP)

( * ) Notice: Subject to any disclaimer, the term of this patent is extended or adjusted under 35 U.S.C. 154(b) by 61 days.

(21) Appl. No.: 11/659,809

(22) PCT Filed: Jul. 15, 2005

(86) PCT No.: PCT/JP2005/013176

§ 371 (c)(1), (2), (4) Date: Feb. 9, 2007

(87) PCT Pub. No.: WO2006/018944

PCT Pub. Date: Feb. 23, 2006

(65) Prior Publication Data

US 2007/0256481 A1 Nov. 8, 2007

(30) Foreign Application Priority Data

Aug. 18, 2004 (JP) ............................. 2004-238134
Aug. 18, 2004 (JP) ............................. 2004-238139

(51) Int. Cl.
*G01L 3/26* (2006.01)
(52) U.S. Cl. .................................................. 73/114.52
(58) Field of Classification Search .............. 73/114.38, 73/114.42, 114.52, 114.53, 114.54
See application file for complete search history.

(56) References Cited

U.S. PATENT DOCUMENTS 3,998,094 A * 12/1976 Martin .................... 73/114.53

(Continued)

FOREIGN PATENT DOCUMENTS

EP 1 515 034 A1 3/2005

(Continued)

*Primary Examiner*—Eric S McCall
(74) *Attorney, Agent, or Firm*—Kratz, Quintos & Hanson, LLP

(57) ABSTRACT

The present invention is intended to provide a fuel consumption evaluation system which obtains quantitative data to determine whether actual driving has consumed fuel more efficiently or less efficiently than average driving and gives the driver and/or manager concrete advice for fuel-efficient driving based on the obtained data, and also provide a fuel consumption evaluation system which decides, based on obtained fuel efficiency data, whether driving is more fuel-efficient than average driving and sets a target and gives the driver and/or manager concrete advice for fuel-efficient driving based on the obtained data in consideration of change in vehicle total mass without any influence of slopes and traffic flows and particularly encourages and instructs, in real time, the driver to do fuel-efficient driving. The system comprises: engine speed measuring means (2) which measures engine speed of a truck (1); accelerator opening degree measuring means (3) which measures an accelerator opening degree ($\alpha$); vehicle velocity measuring means (4) which measures vehicle velocity (V); fuel flow rate measuring means (5) which measures a fuel flow rate (Fw); and control means (10) which evaluates fuel consumption of the truck from measured engine speed (N), accelerator opening degree ($\alpha$), vehicle velocity (V) and fuel flow rate (Fw).

25 Claims, 23 Drawing Sheets

U.S. PATENT DOCUMENTS 4,150,431 A * 4/1979 Lauterbach ............ 701/123
5,578,748 A * 11/1996 Brehob et al. ........... 73/114.53
6,092,021 A * 7/2000 Ehlbeck et al. .......... 701/123

FOREIGN PATENT DOCUMENTS

| JP | 61-155629 | 7/1986 |
| JP | 2001-108503 | 4/2001 |
| JP | 2001-349764 | 12/2001 |
| JP | 2002-362185 | 12/2002 |
| JP | 2003-16572 | 1/2003 |
| JP | 2003-106182 | 4/2003 |
| JP | 2003-106209 | 4/2003 |
| JP | 2003-328845 | 11/2003 |

* cited by examiner

Fig.4

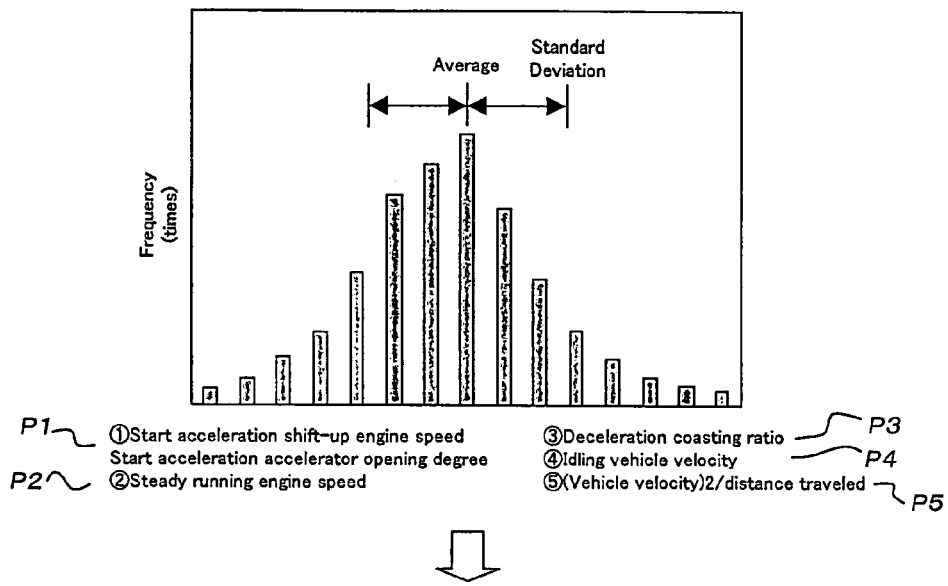

P1 — ①Start acceleration shift-up engine speed
Start acceleration accelerator opening degree
P2 — ②Steady running engine speed
③Deceleration coasting ratio — P3
④Idling vehicle velocity — P4
⑤(Vehicle velocity)2/distance traveled — P5

Fig.5

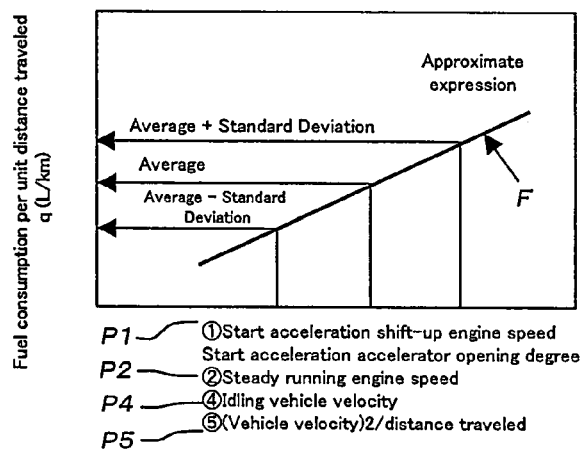

P1 — ①Start acceleration shift-up engine speed
Start acceleration accelerator opening degree
P2 — ②Steady running engine speed
P4 — ④Idling vehicle velocity
P5 — ⑤(Vehicle velocity)2/distance traveled

Fig.6

Table How to calculate fuel consumption

|  | Steady running engine speed | Steady running distance | Fuel consumption /km | Fuel consumption |
|---|---|---|---|---|
| Average + Standard Deviation | 1200rpm | 2000km | 0.30L/km | 600L |
| Average | 1000rpm | | 0.20L/km | 400L |
| Average − Standard Deviation | 800rpm | | 0.10L/km | 200L |
| Fuel consumption difference between average and (average ± standard deviation) | | | | 200L |

NB: Fuel consumption Q = Distance traveled S ´ Fuel consumption per unit distance traveled q (x correction coefficient)

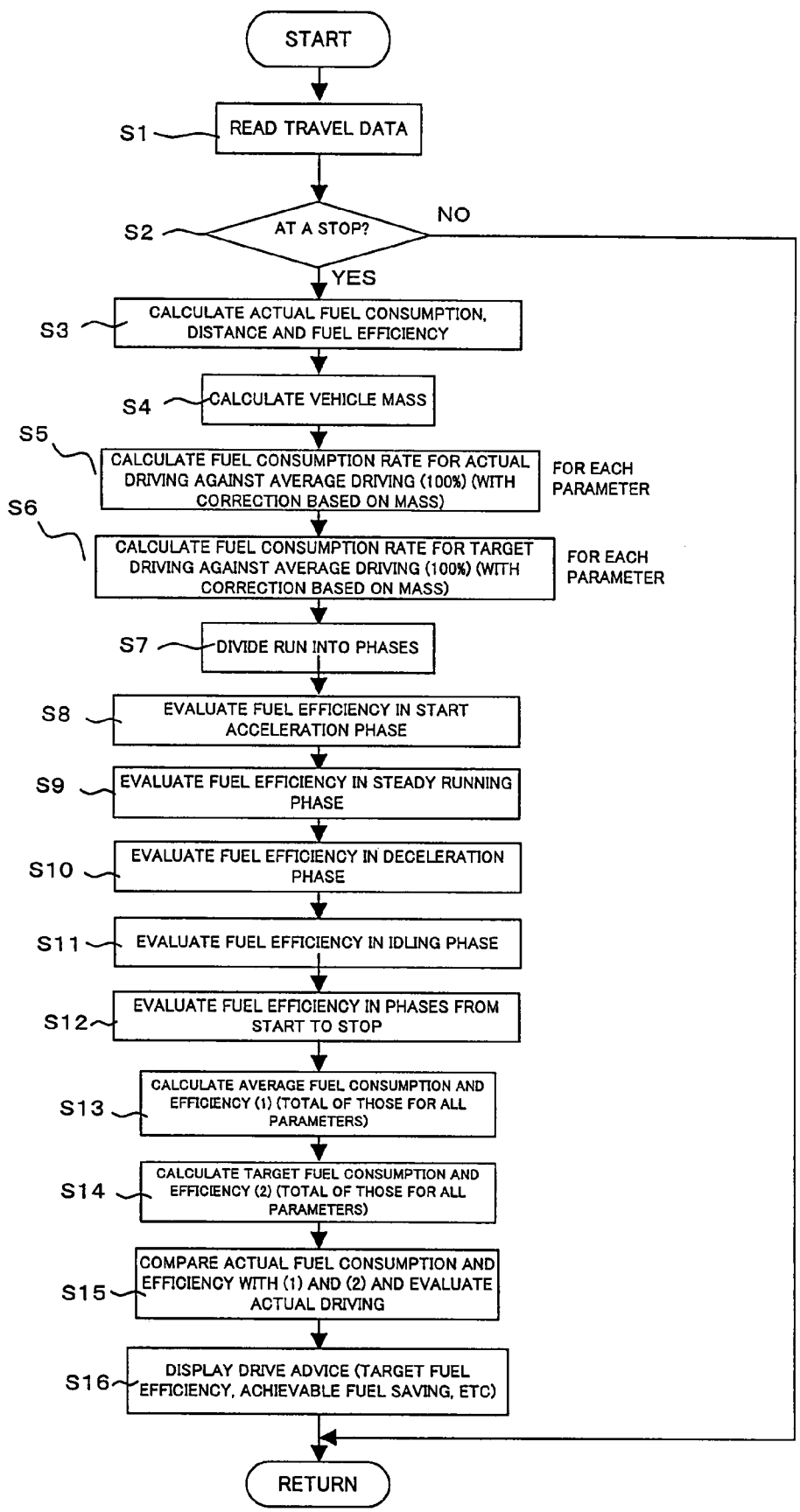

FUEL CONSUMPTION EVALUATION SYSTEM

TECHNICAL FIELD

The present invention relates to a system which evaluates a vehicle's driving conditions such as fuel consumed per unit distance traveled (hereinafter called "fuel efficiency") and also to a system which evaluates driving conditions related to fuel consumption for vehicles in which the difference in vehicle total mass between the unloaded condition and loaded condition is large, such as trucks and buses.

BACKGROUND ART

A technique which encourages a driver to improve his/her driving skill and improves fuel efficiency by an improved driving skill has been publicized (for example, see Patent Document 1).

The above technique uses five parameters for judgment: (1) acceleration, (2) deceleration, (3) vehicle velocity, (4) driving in which a driver does not shift up though he/she can do so, and (5) engine idling.

In this technique, if predetermined thresholds for the parameters (1) to (3) are exceeded, the way of driving concerned is decided to have deteriorated fuel efficiency. This means that when such predetermined thresholds are not exceeded, the way of driving is not decided to have deteriorated fuel efficiency. However, the degree of fuel saving in actual situations should be evaluated in connection with each parameter.

Also, in connection with (3) vehicle velocity, this evaluation method has another problem that since an evaluation is made simply on the basis of vehicle velocity without considering the distance traveled from start to stop, the result of evaluation does not always reflect the real cause of fuel efficiency deterioration or improvement.

In order to solve the above problems, the present inventors have provided a fuel consumption evaluation system which obtains quantitative data to determine whether actual driving consumes fuel more efficiently or less efficiently than average driving and gives the driver and/or manager concrete advice for fuel efficient driving based on the obtained data.

This technique correlates the way of driving with fuel consumption per unit distance traveled. However, in actual situations, roads have slopes and the traffic flow varies from time to time, which affects fuel consumption. Therefore, even when the way of driving is constant, fuel consumption per unit distance may easily deviate from the previously estimated level.

Furthermore, although fuel consumption depends on vehicle total mass including freight or passengers, the influence of slopes and vehicle total mass are not reflected in evaluations.

In addition, the primary object of the above techniques is to encourage the driver to do fuel-efficient driving, but they do not define any means to encourage, in real time, the driver to do fuel-efficient driving.

As another approach, a driving information provision system has been proposed in which different analyses of the driver and the manager are made on the basis of travel data obtained from the vehicle and different appropriate suggestions for improvement are given to the driver and the manager (for example, see Patent Document 2).

However, this driving information provision system does not suggest any means for urging fuel-efficient driving in real time.

Patent Document 1: JP-A No. 2002-362185

Patent Document 2: JP-A No. 2003-16572

DISCLOSURE OF THE INVENTION

Problem to Be Solved by the Invention

The present invention has been made in view of the above problems of the conventional techniques and has an object to provide a fuel consumption evaluation system which obtains quantitative data to determine whether actual driving has consumed fuel more efficiently or less efficiently than average driving and gives the driver and/or manager concrete advice for fuel-efficient driving based on the obtained data, and also provide a fuel consumption evaluation system which sets a target for fuel-efficient driving and gives the driver and/or manager concrete advice for fuel-efficient driving based on obtained data in consideration of change in vehicle total mass without any influence of slopes and traffic flows and particularly encourages and instructs, in real time, the driver to do fuel-efficient driving.

Means for Solving the Problem

A fuel consumption evaluation system according to the present invention comprises: engine speed measuring means (2) which measures engine speed (N) of a truck (1); accelerator opening degree measuring means (3) which measures an accelerator opening degree ($\alpha$); vehicle velocity measuring means (4) which measures vehicle velocity (V); fuel flow rate measuring means (5) which measures a fuel flow rate (Fw); and control means (10) which evaluates fuel consumption (Q) of the truck (1) from measured engine speed (N), accelerator opening degree ($\alpha$), vehicle velocity (V) and fuel flow rate (Fw); the system is characterized in that the control means (10), which has storage means (11), divides a run from start to stop into a plurality of phases (E1: start acceleration phase, E2: steady running phase, E3: deceleration phase, E4: idling phase), sets fuel consumption-related parameters ("start acceleration shift-up engine speed N1 and start acceleration accelerator opening degree $\alpha 1$" P1, "steady running engine speed N2" P2, "deceleration coasting ratio" P3 and "idling velocity V4" P4) for each of the plural phases (E1-E4), determines fuel consumption (Q) for each of the plural phases (E1-E4) based on correlation (correlation line F in FIG. 5) between the parameters (P1, P2, P4) and fuel consumption (fuel consumption per unit distance traveled q), and makes an evaluation based on the determined fuel consumption (Q). (Claim 1)

The plural phases (E1-E4) include: a phase (start acceleration phase E1) in which the accelerator opening degree (a) is increased from a relatively low velocity and vehicle velocity (V) or average moving vehicle velocity (Vm) increases; a phase (deceleration phase E3) in which the accelerator opening degree ($\alpha$) is decreased; a phase (idling phase E4) in which the accelerator opening degree ($\alpha$) is relatively small and engine speed (N) is relatively low; and a steady running phase (E2) which is different from the above three phases (E1, E3, E4). (Claim 2)

In the fuel consumption evaluation system according to the present invention, for the phase (start acceleration phase E1) in which the accelerator opening degree ($\alpha$) is increased from a relatively low velocity and vehicle velocity (V) or average moving vehicle velocity (Vm) increases, the parameters (P1) are engine speed (shift-up engine speed N1) in gear shift and accelerator opening degree ($\alpha$); for the phase (deceleration phase E3) in which the accelerator opening degree (α) is decreased, the parameter (P3) is the ratio (coasting ratio P3) of distance (A) traveled with the accelerator and brake off to the sum (A+B) of distance (A) traveled (coasting) with the accelerator and brake off and distance (B) traveled (deceleration) with the brake on; for the phase (idling phase E4) in which the accelerator opening degree (α) is relatively small and engine speed (N) is relatively low, the parameter (P4) is vehicle velocity (idling vehicle velocity V4); and for the steady running phase (E2) which is different from the above three phases, the parameter (P2) is engine speed (steady running engine speed N2). (Claim 3)

The steady running phase (E2) is divided into a high speed running phase (E21) in which a given distance or more is traveled at a vehicle velocity above a prescribed velocity and another phase (E22) and the parameters (P21) for the high speed running phase (E21) are engine speed (N), vehicle velocity (V), and equivalent to fuel consumed by acceleration before or after braking. (Claim 4)

The plural phases are classified into a phase (E5) in which distance from start to stop is shorter than a predetermined distance and other phases and in the phase (E5) in which distance from start to stop is shorter than a predetermined distance, the parameter (P5) is squared vehicle velocity divided by distance traveled, "vehicle velocity (V)²/distance traveled S". (Claim 5)

In the fuel consumption evaluation system according to the invention, correlation (correlation line F in FIG. 5) between the parameters ("start acceleration shift-up engine speed N1 and start acceleration accelerator opening degree α1" P1, "steady running engine speed N2" P2, and "idling velocity V4" P4, and in the phase where the distance from start to stop is shorter than a predetermined distance, "vehicle velocity (V)²/distance traveled S" P5) and fuel consumption (fuel consumption per unit distance traveled q) is statistically calculated from data stored in the storage means (11) for the phase (start acceleration phase E1) in which the accelerator opening degree (α) is increased from a relatively low velocity and vehicle velocity (V) or average moving vehicle velocity (Vm) increases, the phase (idling phase E4) in which the accelerator opening degree (α) is relatively small and engine speed (N) is relatively low, and the steady running phase (E2). (Claim 6)

In the fuel consumption evaluation system according to the invention, for the phase (deceleration phase E3) in which the accelerator opening degree (α) is decreased, fuel consumption (Q) is determined according to distance traveled (S) in the phase (E3), distance traveled (coasting) (A) with the accelerator and brake off, and fuel efficiency (fuel consumption for distance traveled in the phase q). (Claim 7)

The control means (10) compares determined fuel consumption (Q) against average (Qm) obtained from data stored in the storage means (11). (Claim 8)

The control means (10) compares determined fuel consumption (Q) against target. (Claim 9)

In the fuel consumption evaluation system according to the invention, data for a running condition in which determined fuel consumption (Q) may be inaccurate is ignored. (Claim 10)

Here, running conditions which may cause an inaccurate data include uphill slopes, downhill slopes or a run in which the accelerator is repeatedly turned on and off.

In addition, in the fuel consumption evaluation system according to the invention, output means (for example, display 13, printer 14, etc) are provided and determined fuel consumption (Q) and evaluation based on comparison against average or target are outputted. (Claim 11)

A fuel consumption evaluation system according to the invention comprises: engine speed measuring means (2) which measures engine speed (N) of a vehicle (1); accelerator opening degree measuring means (3) which measures an accelerator opening degree (α); vehicle velocity measuring means (4) which measures vehicle velocity (V); fuel flow rate measuring means (5) which measures a fuel flowrate (Fw); engine load measuring means (6) which measures engine load (L); and control means (20) (onboard database 7) which calculates fuel consumption (Q) of the vehicle (1) and vehicle mass (m) from measured engine speed (N), accelerator opening degree (α), vehicle velocity (V), fuel flow rate (Fw) and engine load (L); the system is characterized in that the control means (20), which has storage means (onboard database 7), divides a run from start to stop into a plurality of phases (E1-E4), sets fuel consumption-related parameters ("start acceleration shift-up engine speed N1" P1, "start acceleration accelerator opening degree α1" P2, "steady running engine speed N2" P3, "vehicle velocity (V)²/distance traveled" P4, "deceleration coasting ratio" P5 and "idling velocity" P6) for each of the plural phases (E1-E4), calculates fuel consumption rate for actual driving against average driving and fuel consumption rate (λ) for target driving against average driving based on correlation between the parameters (P1-P6) and fuel consumption rate against average driving, and makes an evaluation based on the calculated fuel consumption rates. (Claim 12)

The plural phases (E1-E4) include: a phase (start acceleration phase E1) in which the accelerator opening degree (α) is increased from a relatively low velocity and vehicle velocity (V) or average moving vehicle velocity increases; a phase (deceleration phase E3) in which the accelerator opening degree (α) is decreased; a phase (idling phase E4) in which the accelerator opening degree (α) is relatively small and engine speed (N) is relatively low; and a steady running phase (E2) which is different from the above three phases (E1, E3, E4). (Claim 13)

In the fuel consumption evaluation system according to the invention, for the phase (start acceleration phase E1) in which the accelerator opening degree (α) is increased from a relatively low velocity and vehicle velocity (V) or average moving vehicle velocity increases, the parameters P1, P2) are engine speed (shift-up engine speed N1: P1) in gear shift and accelerator opening degree (α1: P2); for the phase (deceleration phase E3) in which the accelerator opening degree (α) is decreased, the parameter (deceleration coasting ratio: P5) is the ratio of distance (A) traveled with the accelerator and brake off to the sum (A+B) of distance (A) traveled with the accelerator and brake off and distance (B) traveled with the brake on; for the phase (idling phase E4) in which the accelerator opening degree (α) is relatively small and engine speed (N) is relatively low, the parameter (P6) is vehicle velocity; and for the steady running phase (E2) which is different from the above three phases, the parameter (P3) is engine speed (steady running engine speed N2). (Claim 4)

Preferably the parameter for fuel consumption in a run from start to stop should be squared vehicle velocity divided by distance traveled, or (vehicle velocity)²/distance traveled.

The steady running phase (E2) is divided into a high speed running phase in which a given distance or more is traveled at a vehicle velocity above a prescribed velocity and other phases for the purpose of data collection. (Claim 15)

In calculating fuel consumption for actual driving, data from the fuel flow rate measuring means (5) is integrated for each of the plural phases (E1-E4) and all the integrated values for the phases (E1-E4) from start to stop are totaled. (Claim 16)

For all the parameters (P1-P6), actual vehicle total mass (m) is calculated for measured vehicle velocity (V) and the vehicle's specification and an evaluation of fuel consumption is made in consideration of the vehicle total mass (m). (Claim 17)

Output means (26) are provided and fuel consumption rate for actual driving against average driving and fuel consumption rate for target driving against average driving are calculated and an evaluation based on the calculated fuel consumption rates is outputted. (Claim 18)

A fuel consumption evaluation system according to the invention comprises: engine speed measuring means (2) which measures engine speed (N) of a vehicle (1); accelerator opening degree measuring means (3) which measures an accelerator opening degree ($\alpha$); vehicle velocity measuring means (4) which measures vehicle velocity (V); fuel flow rate measuring means (5) which measures a fuel flow rate (Fw); engine load measuring means (6) which measures engine load (L); and storage means (onboard database 7) which stores data on measured engine speed (N), accelerator opening degree ($\alpha$), vehicle velocity (v), fuel flow rate (Fw) and engine load (L); control means (20) which calculates fuel consumption (Q) of the vehicle (1) and vehicle mass (m) from the various data; and display means (monitor 12) which is installed in the vehicle (1); the system is characterized in that the control means (20) divides a run from start to stop into a plurality of phases (E1-E4), sets fuel consumption-related parameters ("start acceleration shift-up engine speed N1" P1, "start acceleration accelerator opening degree $\alpha 1$" P2, "steady running engine speed N2" P3, "vehicle velocity (V)$^2$/distance traveled"P4, "deceleration coasting ratio" P5 and "idling velocity" P6) for each of the plural phases (E1-E4), calculates fuel consumption rate ($\lambda$) of actual driving against average driving and fuel consumption rate ($\lambda$) of target driving against average driving based on correlation between the parameters (P1-P6) and fuel consumption rates ($\lambda$) against average driving, makes an evaluation based on the calculated fuel consumption rates ($\lambda$), and displays the evaluation result on the display means (monitor 12). (Claim 19)

The plural phases (E1-E4) include: a phase (start acceleration phase E1) in which the accelerator opening degree ($\alpha$) is increased from a relatively low velocity and vehicle velocity (V) or average moving vehicle velocity increases; a phase (deceleration phase E3) in which the accelerator opening degree ($\alpha$) is decreased; a phase (idling phase E4) in which the accelerator opening degree ($\alpha$) is relatively small and engine speed (N) is relatively low; and a steady running phase (E2) which is different from the above three phases. (Claim 20)

In the fuel consumption evaluation system according to the invention, for the phase (start acceleration phase E1) in which the accelerator opening degree ($\alpha$) is increased from a relatively low velocity and vehicle velocity (V) or average moving vehicle velocity increases, the parameters (P1, P2) are engine speed (shift-up engine speed N1: P1) in gear shift and accelerator opening degree ($\alpha 1$: P2); for the phase (deceleration phase E3) in which the accelerator opening degree ($\alpha$) is decreased, the parameter (deceleration coasting ratio P5) is the ratio of distance (A) traveled with the accelerator and brake off to the sum (A+B) of distance (A) traveled with the accelerator and brake off and distance (B) traveled (deceleration) with the brake on; for the phase (idling phase E4) in which the accelerator opening degree (a) is relatively small and engine speed (N) is relatively low, the parameter (P6) is vehicle velocity; and for the steady running phase which is different from the above three phases, the parameter (P3) is engine speed (steady running engine speed N2). (Claim 21)

Preferably the parameter for fuel consumption in a run from start to stop should be squared vehicle velocity divided by distance traveled, or vehicle velocity (V)$^2$/distance traveled.

The steady running phase (E2) is divided into a high speed running phase in which a given distance or more is traveled at a vehicle velocity above a prescribed velocity and other phases for the purpose of data collection. (Claim 22)

In calculating fuel consumption for actual driving, data from the fuel flow rate measuring means (5) is integrated for each of the plural phases (E1-E4) and all the integrated values for the phases (E1-E4) from start to stop are totaled. (Claim 23)

For all the parameters (P1-P6), actual vehicle total mass (m) is calculated for measured vehicle velocity (V) and the vehicle (1)'s specification and an evaluation of fuel consumption is made in consideration of the vehicle total mass (m). (Claim 24)

Output means (22) are provided and fuel consumption rate for actual driving against average driving and fuel consumption rate for target driving against average driving are calculated and an evaluation based on the calculated fuel consumption rates is outputted. (Claim 25)

EFFECT OF THE INVENTION

The fuel consumption evaluation system with the configuration and evaluation method according to claims 1 to 11 of the invention divides stored travel data from start to stop into a plurality of phases (E1: start acceleration phase, E2: steady running phase, E3: deceleration phase, E4: idling phase) (FIG. 2), sets fuel consumption-related parameters ("start acceleration shift-up engine speed N1 and accelerator opening degree $\alpha 1$" P1, "steady running engine speed N2" P2, "deceleration coasting ratio" P3 and "idling velocity V4" P4 or "(vehicle velocity)$^2$/distance traveled S" P5) for each of the plural phases (FIG. 4), determines fuel consumption (Q1-Q4) for each of the plural phases (E1-E4) based on correlation (correlation line F in FIG. 5) between the parameters and fuel consumption (fuel consumption per unit distance traveled q), and makes an evaluation based on the determined fuel consumption (Q).

The abovementioned parameters (P1-P5) are easily associated with the way of driving to improve the accuracy of fuel consumption (Q) calculated on the basis of these parameters.

A frequency distribution of travel data in connection with each of the parameters (P1-P5) is nearly a normal distribution (FIG. 4). By processing numerous such travel data, the average (mean value) and the degree of dispersion can be known in the frequency distribution for each of the parameters (P1-P5).

Such data is added to the database (11) to create a new database with improved accuracy; and also the database can be updated to match the performance of an upgraded vehicle (1).

The parameters (P1, P2, P4, P5) except "deceleration coasting ratio" (P3) are correlated with fuel consumption per unit distance (q) for each phase (E1-E5) (correlation line F in FIG. 5). Therefore, average fuel consumption per unit distance (q) [L/km] can be calculated from the average (mean value) in the frequency distribution for each of the parameters (FIG. 4) and correlation between the parameters and fuel consumption per unit distance (q) (correlation line F in FIG. 5). Average fuel consumption for each running phase can be calculated by multiplying this value by distance traveled (S)

for each phase. When the calculated average fuel consumption for each phase is multiplied by a correction coefficient (K) as necessary, more adequate fuel consumption data can be obtained. By comparing the fuel consumption (Q) calculated from actual travel data against the average fuel consumption (Qm) for each phase as calculated by this method, how much fuel has been saved or wasted as compared to average driving can be quantitatively known (FIG. 6). Also this can be associated with the driver's way of driving.

In connection with deceleration coasting ratio (P3), fuel efficiency is improved by taking full advantage of the kinetic energy of the vehicle (truck) 1 and minimizing the use of the brake.

According to the present invention, Equation 1 given below may be used in order to quantitatively know how much fuel has been saved (if the calculation result is negative) or wasted (if it is positive) as compared to the average way of using the coasting mode):

$$\Delta Q = Sd \times (\beta - \gamma)/100q$$ (Equation 1)

where $\Delta Q$: fuel saving (unit: L) against the average (mean) (Qm) of fuel consumption in the deceleration phase (E3) (if negative), (or fuel waste if positive);

Sd: distance traveled [unit: km] in the deceleration phase E3)

$\beta$: average deceleration coasting ratio [unit: %]

$\gamma$: actual deceleration coasting ratio [unit: %]

q: fuel consumption per unit distance traveled [unit: L/km]

If a target deceleration coasting ratio is substituted for the average deceleration coasting ratio in Equation 1, whether fuel has been saved or wasted as compared to the target is known.

Furthermore, if, in reference to standard deviation, etc. in a frequency distribution, the target for each parameter is assumed to be the average +(or −) 0.0σ (standard deviation), the target fuel consumption per unit distance for each parameter can be obtained. By comparison of actual travel data against this target, it is possible to quantitatively evaluate how better or worse the driver's way of driving and fuel consumption are than the target.

Since actual driving and fuel consumption can be quantitatively evaluated in comparison with average (Qm) or target as mentioned above, it is possible to concretely advise how to drive and how to improve the way of driving and show fuel consumption saving achievable by the improvement in monetary terms in a report handed to the driver and/or manager.

It is also possible to evaluate the overall saving or waste of fuel as compared to the average or target fuel consumption by comparing the total of fuel consumptions determined from the parameters in actual travel data against the total of average or target fuel consumptions.

The average level may be variable to suit the situation of each freight company. Similarly the target level may be variable.

When decelerations due to downhill slopes and decelerations from high speed are excluded from the decelerating distance in the deceleration phase, analysis better reflects the influence of the driver's way of driving.

Here, the road is decided to be a "downhill slope" when the accelerator opening degree is below a prescribed level and the engine speed is above a predetermined value, and an acceleration above a prescribed level for a relevant gear ratio is generated. When the traveled distance thus related to a downhill slope is excluded from the decelerating distance and the coasting distance, analysis better reflects the influence of the driver's way of driving in the deceleration phase including a "downhill slope".

When calculating deceleration coasting ratio (P3) in the deceleration phase, if the accelerator should be intentionally turned on and off repeatedly (periodically), the deceleration coasting ratio (P3) would become high, resulting in a misjudgment that fuel-efficient driving has been done. In order to avoid such a misjudgment, a decision is made as to whether the accelerator has been turned on and off periodically and the corresponding distance is excluded from the decelerating distance so that the deceleration coasting ratio is properly determined.

When calculating steady running engine speed in the steady running phase, uphill slopes are excluded from the calculation so that analysis better reflects the influence of the driver's way of driving.

Here, the road is decided to be a "downhill slope" when the accelerator opening degree is above a prescribed level and the acceleration is below a prescribed acceleration level for a relevant gear ratio. The traveled distance thus related to an uphill slope is excluded from calculation of the steady running engine speed so that analysis better reflects the influence of the driver's way of driving in the steady running phase including an "uphill slope".

In order to evaluate the degree of driving fuel efficiency in a high speed running phase (E21), the following three evaluation parameters are used: (1) High speed running engine speed; (2) High speed running vehicle velocity; and (3) Ineffective braking Parameters (1) and (2) are correlated with fuel consumption per unit distance (q) and evaluations can be made with the abovementioned procedure. For parameter (3), the quantity of fuel consumed to accelerate the vehicle before or after braking is calculated. An extra fuel consumption is calculated by subtracting from this calculated quantity of consumed fuel the quantity of fuel which would be consumed by driving normally or without braking.

The extra fuel consumption thus calculated is compared with the extra fuel consumed by average driving with braking and the surplus may be considered to be wasted fuel.

Besides, it is possible to calculate the time period of idling during a stop and the quantity of fuel consumed by such idling so that the driver is advised and supervised to avoid long idling during a stop and waste of fuel. Doing so will raise the driver's awareness of fuel-efficient driving and help enhance the corporate image of the freight company.

The advantageous effects of the fuel consumption evaluation system according to claims 1 to 11 are summarized below:

(1) Since it is possible to know concretely how the way of driving should be improved and how much fuel can be saved by such improvement, the driver is well motivated to make an effort toward fuel-efficient driving.

(2) The manager can know quantitatively from fuel consumption data about how fuel-efficiently the driver drove the vehicle actually and make the driver's effort reflected in the evaluation of the driver. Also, concrete driving advice can be given on the basis of the database.

(3) All that has been mentioned above leads to a considerable saving in fuel consumption and contributes to cost reduction and global environmental conservation and a better corporate image.

The fuel consumption evaluation system with the configuration and evaluation method according to claims 12 to 18 of the invention divides stored travel data from start to stop into a plurality of phases (E1: start acceleration phase, E2: steady running phase, E3: deceleration phase, E4: idling phase) (FIG. 10), sets fuel consumption-related parameters ("start acceleration shift-up engine speed N1" P1, "start acceleration accelerator opening degree α1" P2, "steady running engine speed N2" P3, "vehicle velocity (V)²/distance traveled" P4, "deceleration coasting ratio" P5 and "idling velocity" P6) for each of the plural phases, calculates the fuel consumption rate for actual driving and the fuel consumption rate for target driving based on correlation between the parameters (P1-P6) and fuel consumption rate (λ) for a given way of driving against average driving (100%), and further makes a correction on the calculated fuel consumption rate based on actual vehicle total mass, so that fuel consumption is accurately evaluated.

Since not only an absolute value of fuel consumption is shown but also comparison against average driving and target driving is made parameter by parameter, the evaluation is easy to understand and realistic measures to improve fuel efficiency (promote fuel-efficient driving) can be taken.

A target fuel efficiency and the quantity of fuel which can be saved can be calculated as follows.

The following steps are taken for each parameter (P1-P6) in each phase (E1-E4).

(1) Fuel consumption for actual driving (Gj) is calculated by integrating fuel flow rate signal data from a fuel meter (5) or an engine control unit (not shown).

(2) Fuel consumption for average driving (Ga) is calculated by multiplying the fuel consumption for actual driving (Gj) by the fuel consumption rate for average driving (a=100%) against fuel consumption rate (λ) for actual driving and then dividing the product by fuel consumption rate for actual driving (λj).

$$Ga = Gj \times a/\lambda j$$

(3) Fuel consumption for target driving (Gt) is calculated by multiplying the fuel consumption for actual driving (Gj) by fuel consumption rate for target driving (λt) and then dividing the product by fuel consumption rate for actual driving (λj).

$$Gt = Gj \times \lambda t/\lambda j$$

(4) The quantity of fuel which can be saved, namely the difference (ΔG) between the fuel consumption for actual driving and that for target driving is calculated by subtracting fuel consumption for target driving (Gt) from fuel consumption for actual driving (Gj).

$$\Delta G = Gj - Gt$$

Next, the calculation results for each running phase (way of driving) are totaled to calculate the following values for a single run (from start to stop) or a single travel.

(5) Fuel saving achievable in each run (from start to stop) or travel can be calculated by taking the above steps (1) to (4) to calculate the quantity of fuel which can be saved for each driving parameter and totaling the results. Also the quantity of fuel which can be saved in the deceleration phase is calculated from the deceleration coasting ratio and the result is added to the total.

(6) The fuel consumption for target driving is calculated by subtracting the total of quantities of fuel which can be saved for the parameters, from the actual fuel consumption.

(7) The target fuel efficiency is calculated by dividing the fuel consumption for target driving by the distance traveled.

In this way, the target fuel efficiency is calculated accurately.

The "target" for target driving may be obtained, for example, by subtracting the standard deviation from the average in the frequency distribution as shown in FIG. 11.

Since the above various fuel consumption data are outputted by the output means (22) and actual driving and fuel consumption can be quantitatively evaluated against the target for each parameter (P1-P6), it is possible to concretely advise how to drive and how to improve the way of driving and show fuel consumption saving achievable by the improvement in monetary terms in a report handed to the driver and/or manager.

It is also possible to evaluate the overall saving or waste of fuel as compared to the average or target fuel consumption by comparing the total of fuel consumptions determined from the parameters (P1-P6) in actual travel data against the total of average or target fuel consumptions.

The level of average driving may be variable in order to suit the situation of each freight company. Likewise the level of target driving may be variable.

When calculating the deceleration coasting ratio (related to parameter P5) in the deceleration phase, if the accelerator should be intentionally turned on and off repeatedly (periodically), the deceleration coasting ratio (P5) would become high, resulting in a misjudgment that fuel-efficient driving has been done. In order to avoid such a misjudgment, a decision is made as to whether the accelerator has been turned on and off periodically and the corresponding distance is excluded from the decelerating distance so that the deceleration coasting ratio is properly determined.

It is possible to calculate the time period of idling during a stop and the quantity of fuel consumed by such idling so that the driver is advised and supervised to avoid long idling (related to parameter P6) during a stop and waste of fuel. Doing so will raise the driver's awareness of fuel-efficient driving and help enhance the corporate image of the freight company.

The advantageous effects of the fuel consumption evaluation system according to claims 12 to 18 are summarized below:

(1) Since it is possible to know concretely how the way of driving should be improved and how much fuel can be saved by such improvement in comparison with average driving, the driver is well motivated to make an effort toward fuel-efficient driving.

(2) The manager can know how fuel-efficiently the driver drove the vehicle actually in comparison with average driving in terms of fuel consumption rate as comparison data and make the driver's effort reflected in the evaluation of the driver. Also, concrete driving advice can be given on the basis of the database.

(3) An evaluation of fuel consumption can be made accurately in consideration of change in vehicle total mass without any influence of slopes and traffic flows (4) All that has been mentioned above leads to a considerable saving in fuel consumption and contributes to cost reduction and global environmental conservation and a better corporate image.

The fuel consumption evaluation system with the configuration and evaluation method according to claims 19 to 25 of the invention divides stored travel data from start to stop into a plurality of phases (E1: start acceleration phase, E2: steady running phase, E3: deceleration phase, E4: idling phase) (FIG. 22), sets fuel consumption-related parameters ("start acceleration shift-up engine speed N1" P1, "start acceleration accelerator opening degree α1" P2, "steady running engine speed N2" P3, "vehicle velocity (V)²/distance traveled" P4, "deceleration coasting ratio" P5 and "idling velocity" P6) for each of the plural phases, calculates the fuel consumption rate for actual driving and the fuel consumption rate (λ) of target driving based on correlation between the parameters (P1-P6) and fuel consumption rate (λ) for a given way of driving against average driving (100%), and further makes a correction on the calculated fuel consumption rate based on actual vehicle total mass, so that fuel consumption is accurately evaluated.

Since an evaluation of fuel consumption is shown on the onboard display means (monitor 12) in real time, it is possible to learn fuel-efficient driving through OJT (on the job training).

Since not only an absolute value of fuel consumption is shown but also comparison against average driving and target driving is made parameter by parameter, the evaluation is easy to understand and realistic measures to improve fuel efficiency (promote fuel-efficient driving) can be taken immediately.

A target fuel efficiency and the quantity of fuel which can be saved can be calculated as follows.

The following steps are taken for each parameter (P1-P6) in each phase (E1-E4).

(1) Fuel consumption for actual driving (Gj) is calculated by integrating fuel flow rate signal data from the fuel meter (5) or the engine control unit (not shown).

(2) Fuel consumption for average driving (Ga) is calculated by multiplying the fuel consumption for actual driving (Gj) by the fuel consumption rate for average driving (λa=100%) against fuel consumption rate (λ) for actual driving and then dividing the product by fuel consumption rate for actual driving (j)

$$Ga = Gj \times \lambda a / \lambda j$$

(3) Fuel consumption for target driving (Gt) is calculated by multiplying the fuel consumption for actual driving (Gj) by fuel consumption rate for target driving (λt) and then dividing the product by fuel consumption rate for actual driving (λj).

$$Ga = Gj \times \lambda t / \lambda j$$

(4) The quantity of fuel which can be saved, namely the difference (ΔG) between the fuel consumption for actual driving and that for target driving is calculated by subtracting fuel consumption for target driving (Gt) from fuel consumption for actual driving (Gj).

$$\Delta G = Gj - Gt$$

Next, the calculation results for each running phase (way of driving) are totaled to calculate the following values for a single run (from start to stop) or a single travel.

(5) The total quantity of fuel which can be saved in each run (from start to stop) or travel can be calculated by calculating the quantity of fuel which can be saved for each driving parameter and totaling the results. Also in connection with the deceleration phase, the quantity of fuel which can be saved is calculated from the deceleration coasting ratio and the result is added to the total.

(6) The fuel consumption for target driving is calculated by subtracting the total of quantities of fuel which can be saved for the parameters, from the actual fuel consumption.

(7) The target fuel efficiency is calculated by dividing the distance traveled by the fuel consumption for actual driving.

In this way, the target fuel efficiency is calculated accurately.

The "target" for target driving may be obtained, for example, by subtracting the standard deviation from the average in the frequency distribution as shown in FIG. 23.

Since the above various fuel consumption data are outputted by the output means (22) and the fuel efficiency of actual driving and fuel consumption can be quantitatively evaluated against the target for each parameter (P1-P6), it is possible to concretely advise how to drive and how to improve the way of driving and show fuel consumption saving achievable by the improvement in monetary terms in a report handed to the driver and/or manager.

It is also possible to evaluate the overall saving or waste of fuel as compared to the average or target fuel consumption by comparing the total of fuel consumptions determined from the parameters (P1-P6) in actual travel data against the total of average or target fuel consumptions.

The above information appears in real time on the monitor 12 in the vehicle (1), which is very useful in education about fuel efficient driving.

The level of average driving may be variable in order to suit the situation of each freight company. Likewise the level of target driving may be variable.

When calculating the deceleration coasting ratio (related to parameter P5) in the deceleration phase, if the accelerator should be intentionally turned on and off repeatedly (periodically), the deceleration coasting ratio (P5) would become high, resulting in a misjudgment that fuel-efficient driving has been done. In order to avoid such a misjudgment, a decision is made as to whether the accelerator has been turned on and off periodically and the corresponding distance is excluded from the decelerating distance so that the deceleration coasting ratio is properly determined.

It is possible to calculate the time period of idling during a stop and the quantity of fuel consumed by such idling so that the driver is advised and supervised to avoid long idling (related to parameter P6) during a stop and waste of fuel. Doing so will raise the driver's awareness of fuel-efficient driving and help enhance the corporate image of the freight company.

The advantageous effects of the fuel consumption evaluation system according to claims 19 to 25 are summarized below:

(1) Since it is possible to know concretely how the way of driving should be improved and how much fuel can be saved by such improvement in comparison with average driving, the driver is well motivated to make an effort toward fuel efficient driving.

(2) The manager can know how fuel-efficiently the driver drove the vehicle actually in comparison with average driving in terms of fuel consumption rate as comparison data and make the driver's effort reflected in the evaluation of the driver. Also, concrete driving advice can be given on the basis of the database.

(3) An evaluation of fuel consumption can be made accurately in consideration of change in vehicle total mass without any influence of slopes and traffic flows.

(4) All information as mentioned above in (1)-(4) appears in real time on the monitor 12, which is very useful for the driver to learn fuel-efficient driving.

(5) All that has been mentioned above leads to a considerable saving in fuel consumption and contributes to cost reduction and global environmental conservation and a better corporate image.

BEST MODE FOR CARRYING OUT THE INVENTION

Next, preferred embodiments of the present invention will be described in reference to the accompanying drawings.

First, a first embodiment of the invention will be described in reference to FIGS. 1 to 7.

The fuel consumption evaluation system according to the first embodiment comprises: engine speed measuring means 2 which measures the engine speed (number of revolutions) N of a truck 1 (hereinafter the engine speed measuring means is called the engine speed sensor); accelerator opening degree measuring means 3 which measures accelerator opening degree α (hereinafter the accelerator opening degree measuring means is called the accelerator opening degree sensor); vehicle velocity measuring means 4 which measures vehicle velocity V (hereinafter the vehicle velocity measuring means is called the vehicle velocity sensor); fuel flow rate measuring means 5 which measures fuel flow rate Fw (hereinafter the means is called the fuel meter); and control means 10 which evaluates fuel consumption Q of the truck 1 from the measured engine speed N, accelerator opening degree α, vehicle velocity V, and fuel flow rate Fw (hereinafter the control means is called the control unit).

The control unit 10 includes storage means 11 mounted in the vehicle 1 to be evaluated (hereinafter the storage means is called the database), and for example, a computer unit 12, a display unit 13, input means 14 and a printer 15 which are installed in a business office, and a memory card 16 which the driver can carry.

As shown in FIG. 2, the control unit 10 divides a run from start to stop into four phases: start acceleration phase E1, steady running phase E2, deceleration phase E3, and idling phase E4. For the four phases E1-E4, it sets parameters P1-P4 related to fuel consumption Q respectively where P1 refers to "start acceleration shift-up engine speed N1 and accelerator opening degree α1", P2 "steady running engine speed N2", P3 "deceleration coasting ratio" and P4 "idling velocity V4". It determines fuel consumptions (quantities) Q1-Q4 for the phases E1-E4 based on correlation between the parameters P1-P4 and fuel efficiency (fuel consumption per unit distance traveled) q (expressed by correlation line F in FIG. 5) and makes an evaluation based on the determined fuel consumptions Q1-Q4.

When the distance traveled from start to stop is not so long and the vehicle velocity is high in the period from start to stop, the ratio of energy discarded as heat by braking is large. Therefore, when the distance traveled is below a predetermined distance, "vehicle velocity $(V)^2$/distance traveled S" is used as parameter P5 for fuel efficiency evaluation.

Here, what parameter P5 "vehicle velocity $(V)^2$/distance traveled S" means is expressed by a characteristic graph in FIG. 3 which shows squared vehicle velocity V versus distance traveled S. In the graph, characteristic line a represents driving with average acceleration and deceleration and characteristic line b represents driving with a vehicle velocity higher than necessary. The graph illustrates that a vehicle velocity higher than necessary requires a larger energy and the energy is discarded as braking heat during deceleration, resulting in waste of energy. The zone surrounded by the lines a and b expresses the energy which is wasted as compared to driving with average acceleration and deceleration.

On the other hand, characteristic line c represents driving with the minimum required energy consumed by acceleration and therefore the zone surrounded by the lines a and c conceptually expresses the saved energy.

Here, the reason that squared vehicle velocity V is divided by distance traveled S is that the distance traveled varies from one case to another and thus comparison in velocity per unit distance ensures equity in comparison.

The abovementioned parameters P1-P5 are easily associated with the way of driving and accuracy is improved in the calculation of fuel consumption Q on the basis of these parameters.

A frequency distribution of travel data in connection with each of the parameters P1-P5 is nearly a normal distribution as shown in FIG. 4. By processing numerous such travel data, the average (mean value) and the degree of dispersion in the frequency distribution for each of the parameters P1-P5 can be known.

Such data is added to the database 11 in the control unit 10 to create a new database with improved accuracy; and also as upgraded vehicle models are introduced year by year, the database can be updated to match the performance of an upgraded vehicle 1.

The parameters except P3 "deceleration coasting ratio", namely "start acceleration shift-up engine speed N1 and accelerator opening degree α1" P1, "steady running engine speed N2" P2, "idling velocity V4" P4 and "(vehicle velocity) $^2$/distance traveled S" P5 are correlated with fuel efficiency (fuel consumption per unit distance q) for each phase (E1-).

An average fuel efficiency (fuel consumption per unit distance q) [L/km] can be calculated from the average (mean value) in the frequency distribution for each of the parameters P1, P2, P4 and P5 (FIG. 4) and the correlation between the parameter and fuel efficiency (fuel consumption per unit distance q) (correlation line F in FIG. 5).

As shown by the formula in FIG. 6 (in the margin of Table 1: How to Calculate Fuel Consumption), an average fuel consumption (Q: Q1-) in each phase (E1-E5) can be calculated by multiplying this value q by distance traveled S in each phase.

That is, the calculation formula for fuel consumption Q is as follows:

Q=S×q (Equation 2) (in some cases, Q is multiplied by correction coefficient K)

where

Q: fuel consumption [unit: L]

S: distance traveled (unit: km)

q: driving fuel efficiency [unit: L/km] (fuel consumption per unit distance traveled as found from FIG. 5)

As an example of calculating fuel consumption Q is given below on the assumption that 2000 km was run steadily and the steady running engine speed N was 1100 rpm.

If driving fuel efficiency q at steady running engine speed 1100 rpm is found from FIG. 5 to be, for example, expressed as follows:

q=0.25 L/km then, $Q$=2000 [km]×0.25 [L/km]=500[L]

Hence, it is found that 100 L (=500−400) of fuel was wasted as compared to the average fuel consumption (middle row in the table) indicated in FIG. 6.

Furthermore, when the calculated average fuel consumption Q for each phase E is multiplied by a correction coefficient as necessary (for example, for a monthly target at a business office), more adequate fuel consumption data can be obtained.

By comparing the fuel consumption Q calculated from actual travel data against the average fuel consumption Qm for each phase as calculated by this method, how much fuel has been saved or wasted as compared to average driving can be quantitatively known. Also this can be associated with the driver's way of driving.

In connection with P3 "deceleration coasting ratio" (see FIG. 2 again), fuel efficiency is improved by taking full advantage of the kinetic energy of the vehicle (truck) 1 and minimizing the use of the brake.

According to the present invention, Equation 1 given below may be used in order to quantitatively know how much fuel has been saved (if the calculation result is negative) or wasted (if the calculation result is positive) as compared to the average way of using the coasting mode):

$$\Delta Q = Sd \times (\beta - \gamma)/100q \quad \text{(Equation 1)}$$

where $\Delta Q$: fuel saving [unit: L] against the average Qm of fuel consumption in the deceleration phase (if negative), (or fuel waste if positive);

Sd: distance traveled [unit: km] in the deceleration phase E3)

$\beta$: average deceleration coasting ratio [unit: %]

$\gamma$: actual deceleration coasting ratio [unit: %]

q: fuel consumption per unit distance traveled [unit: L/km]

As mentioned above, if a target deceleration coasting ratio is substituted for the average deceleration coasting ratio in Equation 1, whether fuel has been saved or wasted as compared to the target is known.

Furthermore, if, in reference to standard deviation, etc. in a frequency distribution as shown in FIG. 4, the target for each parameter is assumed to be the average $+$(or $-$) $0.0\sigma$ (standard deviation), the target fuel consumption per unit distance q for each parameter can be obtained. By comparison of actual travel data against this target, it is possible to quantitatively evaluate how better or worse the driver's way of driving and fuel consumption are than the target.

Since actual driving and fuel consumption can be quantitatively evaluated in comparison with the average or target as mentioned above, it is possible to concretely advise how to drive and how to improve the way of driving and show fuel consumption saving achievable by the improvement in monetary terms in a report handed to the driver and/or manager.

It is also possible to evaluate the overall saving or waste of fuel as compared to the average or target fuel consumption by comparing the total of fuel consumptions Q determined from the parameters in actual travel data against the total of average or target fuel consumptions.

The average level may be variable to suit the situation of each freight company. Similarly the target level may be variable.

When decelerations due to downhill slopes and decelerations from high speed are excluded from the decelerating distance in the deceleration phase E3, analysis better reflects the influence of the driver's way of driving.

Here, the road is decided to be a "downhill slope" when the accelerator opening degree $\alpha$ (FIG. 2) detected by the accelerator opening degree sensor (3 in FIG. 1) is below a prescribed level and the engine speed N is above a predetermined value and an acceleration above a prescribed acceleration level for a relevant gear ratio is generated. When the traveled distance thus related to a downhill slope is excluded from the decelerating distance and the coasting distance, analysis better reflects the influence of the driver's way of driving in the deceleration phase including a "downhill slope".

As shown in FIG. 2, when calculating deceleration coasting ratio P3 in the deceleration phase E3 as expressed by A/(A+B) (where A represents coasting distance and B braking distance), if the accelerator should be intentionally turned on and off repeatedly (periodically), the deceleration coasting ratio would become high, resulting in a misjudgment that fuel-efficient driving has been done.

In order to avoid such a misjudgment, a decision is made as to whether the accelerator has been turned on and off periodically and the corresponding distance is excluded from the decelerating distance so that the deceleration coasting ratio is properly determined.

When calculating steady running engine speed N2 in the steady running phase E2, uphill slopes are excluded from the calculation so that analysis better reflects the influence of the driver's way of driving.

Here, the road is decided to be a "downhill slope" when the accelerator opening degree $\alpha$ is above a prescribed level and the acceleration is below a prescribed acceleration level for a relevant gear ratio. The traveled distance thus related to an uphill slope is excluded from calculation of the steady running engine speed so that analysis better reflects the influence of the driver's way of driving in the steady running phase including an "uphill slope".

In order to evaluate the degree of driving fuel efficiency in a high speed running phase E21 (some part of the steady running phase E2 in FIG. 2), the following three evaluation parameters are used:

(1) High speed running engine speed
(2) High speed running vehicle velocity
(3) Ineffective braking Parameters (1) and (2) are correlated with fuel consumption per unit distance q and evaluations can be made with the abovementioned procedure.

For parameter (3), the quantity of fuel consumed to accelerate the vehicle before or after braking is calculated. An extra fuel consumption is calculated by subtracting from this calculated quantity of consumed fuel the quantity of fuel which would be consumed by driving normally or without braking.

Besides, it is possible to calculate the time period of idling during a stop and the quantity of fuel consumed by such idling so that the driver is advised and supervised to avoid long idling during a stop and waste of fuel. Doing so will raise the driver's awareness of fuel-efficient driving and help enhance the corporate image of the freight company.

Next, the evaluation sequence (program) which the fuel consumption evaluation system according to the first embodiment executes will be described referring to FIG. 7.

First, the program is started and travel data stored so far in the onboard database 11 is read, for example, into a memory card 16 (step S1). The copy data in the memory card 16 is entered into a computer 12 at a business office by inserting the memory card 16 into it and the computer 12 calculates actual fuel consumption Q, distance traveled S and fuel efficiency q (step S2).

Then, a run is divided into different phases (start acceleration phase E1, steady running phase E2, deceleration phase E3, idling phase E4) (step S3); and processing for driving fuel efficiency evaluation for the start acceleration phase E1 is performed (step S4); processing for driving fuel efficiency evaluation for the steady running phase E2 is performed (step S5); processing for driving fuel efficiency evaluation for the deceleration phase E3 is performed (step S6); processing for driving fuel efficiency evaluation for the idling phase E4 is performed (step S7); and processing for driving fuel efficiency evaluation for the idling phase E4 is performed (step S8).

Next, average fuel consumption Qm and fuel efficiency (fuel consumption per unit distance) q are calculated (step S9) and subsequently target fuel consumption and fuel efficiency are calculated (step S10).

At step S11, the calculated actual fuel consumption Q and fuel efficiency q are compared against the targets calculated at steps S9 and S10 and actual driving is evaluated. Lastly, all the results are compiled in the form of a drive advice report (step S12) to finish all control operation (evaluation process).

The fuel consumption evaluation system with the above configuration and evaluation method according to the first embodiment offers the following advantages:

(1) Since it is possible to know concretely how the way of driving should be improved and how much fuel can be saved by such improvement, the driver is well motivated to make an effort toward fuel-efficient driving.

(2) The manager can know quantitatively from fuel saving data about how fuel-efficiently the driver drove the vehicle actually and make the driver's effort reflected in the evaluation of the driver. Also, concrete driving advice can be given on the basis of the database.

(3) All that has been mentioned above leads to a considerable saving in fuel consumption and contributes to cost reduction and global environmental conservation and a better corporate image.

Next, a second embodiment of the invention will be described referring to FIG. 8.

In the first embodiment as shown in FIGS. 1 to 7, the detection means for various parameters, namely the engine speed sensor 2, accelerator opening degree sensor 3, vehicle velocity sensor 4 and fuel flow meter 5, are connected with the onboard database 11 through exclusive lines respectively.

On the other hand, in the second embodiment as shown in FIG. 8, an accelerator signal, a fuel flow rate signal, a vehicle velocity signal, and an engine speed signal are collected as digital signals in a LAN repeater 6 by an in-vehicle communication network "in-vehicle LAN" and stored in an onboard database 11 through two wires (communication cable) W. Except these points, the system is substantially equivalent to the first embodiment shown in FIGS. 1 to 7 in all aspects including operation and effects and detailed description of the system is omitted.

Next, a third embodiment of the present invention will be described referring to FIGS. 9 to 18.

As illustrated in FIG. 9, the fuel consumption evaluation system according to the third embodiment consists of equipment U1 in the vehicle and equipment U2 on the management side and a memory card 15 as a means to transfer data collected by the vehicle equipment U1 to the management side equipment U2.

The management side here refers to the vehicle management department of the freight company which owns the vehicle or the like.

The vehicle equipment U1 comprises: engine speed measuring means 2 which measures the engine speed (number of revolutions) of the vehicle (truck in the figure) 1 (hereinafter the engine speed measuring means is called the engine speed sensor); accelerator opening degree measuring means 3 which measures accelerator opening degree α (hereinafter the accelerator opening degree measuring means is called the accelerator opening degree sensor); vehicle velocity measuring means 4 which measures vehicle velocity V (hereinafter the vehicle velocity measuring means is called the vehicle velocity sensor); fuel flow rate measuring means 5 which measures fuel flow rate Fw (hereinafter the fuel flow rate measuring means is called the fuel meter); engine load measuring means 6 which measures engine load L (hereinafter the engine load measuring means is called the engine load sensor); and onboard storage means 7 which stores the measured engine speed N, accelerator opening degree α, vehicle velocity V, fuel flow rate Fw and engine load L as vehicle signals (hereinafter the onboard storage means is called the onboard database).

The management side equipment U2 comprises: control means 20 which calculates the total mass of the vehicle 1 in service from the measured engine speed N, accelerator opening degree α, vehicle velocity V, fuel flow rate Fw, and engine load L as vehicle data and evaluates fuel consumption Q (control unit: a personal computer for fuel efficiency data analysis); a printer 22 as an output means which outputs the result of the evaluation; and a keyboard 24 as an input means supplied with the control unit 20.

As shown in FIG. 10, the control unit 20 divides a run from start to stop into four phases: start acceleration phase E1, steady running phase E2, deceleration phase E3, and idling phase E4.

For the four phases E1-E4, it sets parameters P1-P4 related to fuel consumption Q where P1 refers to "start acceleration shift-up engine speed N1", P2 "start acceleration accelerator opening degree α1", P3 "steady running engine speed N2", P4 "vehicle velocity $(V)^2$/distance traveled", P5 "deceleration coasting ratio" and P6 "idling velocity". It determines fuel consumption rate λ for each of the phases E1-E4 based on correlation between the parameters P1-P6 and fuel consumption rate λ against the fuel consumption rate for average driving which is assumed as 100% (the correlation is expressed by correlation line F in FIG. 12) and makes an evaluation based on the determined fuel consumption rate λ.

When the distance traveled from start to stop is not so long and the vehicle velocity is high in the period from start to stop, the ratio of energy discarded as heat by braking is large. Therefore, when the distance traveled is below a predetermined distance, "(vehicle velocity V)$^2$/distance traveled S" is used as parameter P4 (not shown), which indicates the magnitude of energy discarded as heat by braking, and P4 is evaluated in order to urge the driver to make an effort for fuel-efficient driving.

The abovementioned parameters P1-P6 are easily associated with the way of driving and accuracy is improved in the calculation of fuel consumption Q on the basis of these parameters.

A frequency distribution of travel data in connection with each of the parameters P1-P6 is nearly a normal distribution as shown in FIG. 11. By processing numerous such travel data, the average and the degree of dispersion in the frequency distribution for each of the parameters P1-P6 can be known.

Such data is successively added to the database (not shown) in the control unit 20 to create a new database with improved accuracy; and also as upgraded vehicle models are introduced year by year, the database can be updated to match the performance of an upgraded vehicle 1.

The parameters except "deceleration coasting ratio" P5, namely, "start acceleration shift-up engine speed N1" P1, "start acceleration accelerator opening degree α1" P2, "steady running engine speed N2" P3, "vehicle velocity $(V)^2$/distance traveled" P4 and "idling velocity" P6 are correlated with fuel consumption rate λ against the fuel consumption rate for average driving in each phase (E1-E4) which is assumed as 100%.

Fuel consumption rate λx for actual driving (actual run to be evaluated) can be calculated from the average in the frequency distribution for each of the parameters P1-P4 and P6 (FIG. 11) and the correlation between the parameter and fuel consumption rate λ (correlation line F in FIG. 12).

Furthermore, in the frequency graph of FIG. 11, on the assumption of "target"="average−standard deviation," point Nt in the horizontal axis in FIG. 12 is found as a point corresponding to "target" for the parameter concerned (any of P1-P4 and P6) and a perpendicular line is drawn upward from Nt; then the intersection Ft of the line with the approximate expression (line F) is found to correspond to graduation λt (90% in the case shown here) on the fuel consumption rate λ scale as the vertical axis and thus this value indicates fuel consumption rate λ against the fuel consumption rate for average driving (100%).

Fuel consumption rate for actual driving λj is found by a similar calculation procedure to be 105% in the case shown here.

In this case, the fuel consumption rate for actual driving is worse than that for average driving and its comparison with the target shows that a considerable effort to improve the way of driving is required.

While the above method uses the fuel consumption rate λ expressed as a percentage to the fuel consumption rate for average driving 100% as quantitative data for fuel consumption evaluation, it is also possible to concretely calculate a target fuel efficiency and a quantity of fuel which can be saved.

Next, the procedure of calculating a target fuel efficiency and the quantity of fuel which can be saved will be explained.

The following steps are taken for each parameter (P1-P6) in each phase (E1-E4).

(1) Fuel consumption for actual driving Gj is calculated by integrating fuel flow rate signal data from the fuel meter 5 or the engine control unit (not shown).

(2) Fuel consumption for average driving Ga is calculated by multiplying the fuel consumption for actual driving Gj by fuel consumption rate for average driving (=100%) λa against fuel consumption rate for actual driving λ and then dividing the product by fuel consumption rate for actual driving λj.

$$Ga = Gj \times \lambda a / \lambda j$$

(3) Fuel consumption for target driving Gt is calculated by multiplying the fuel consumption for actual driving Gj by fuel consumption rate for target driving λt and then dividing the product by fuel consumption rate for actual driving λj.

$$Gt = Gj \times \lambda t / \lambda j$$

(4) The quantity of fuel which can be saved, namely the difference ΔG between the fuel consumption for actual driving and that for target driving is calculated by subtracting fuel consumption for target driving Gt from fuel consumption for actual driving Gj.

$$\Delta G = Gj - Gt$$

Next, the calculation results for each running phase (way of driving) are totaled to calculate the following values for a single run (from start to stop) or a single travel.

(5) Fuel saving achievable in each run (from start to stop) or travel can be calculated by taking the above steps (1)-(4) to calculate the quantity of fuel which can be saved for each driving parameter and totaling the results. Also the quantity of fuel which can be saved in the deceleration phase is calculated from the deceleration coasting ratio and the result is added to the total.

(6) The fuel consumption for target driving is calculated by subtracting the total of quantities of fuel which can be saved for the parameters, from the actual fuel consumption.

(7) The target fuel efficiency is calculated by dividing the fuel consumption for target driving by the distance traveled.

In this way, the target fuel efficiency is calculated accurately.

The above method is valid when the total vehicle mass is equal in average driving and actual driving (actual travel).

However, in the case of commercial vehicles, particularly cargo trucks or the like, the vehicle total mass largely differs between the fully loaded condition and the unloaded condition. The fuel consumption largely depends on the vehicle total mass.

FIG. 13 is a correlation graph showing the relation between the way of driving and the fuel consumption rate in the fully loaded condition and FIG. 14 is a correlation graph showing the relation between the way of driving and the fuel consumption rate in the unloaded condition.

In the unloaded condition (FIG. 14), the fuel consumption rate for actual driving and that for target driving against average driving are 103% and 92% respectively; on the other hand, in the fully loaded condition (FIG. 13), the fuel consumption rate for actual driving is 105% and that for target driving is 90%, showing larger differences from average driving.

Here, a correlation exists between the vehicle total mass and fuel consumption rate for a given way of driving λ against average driving (100%). This correlation is expressed by an approximate expression and graphically shown in FIGS. 15 and 16 where correlation line FF in FIG. 15 represents the fuel consumption rate for actual driving and correlation line FF in FIG. 16 represents the fuel consumption rate for target driving.

As shown in FIG. 15, since the vehicle total mass values for the fully loaded and unloaded conditions are known and fuel consumption rates 105% and 103% for the fully loaded and unloaded conditions in actual driving are found from FIGS. 13 and 14 respectively, point Aj for the fully loaded condition and point Bj for the unloaded condition are determined. Points Aj and Bj are connected by line FF and a specific point on the line corresponding to the vehicle total mass in actual driving is chosen and 104% is read as the fuel consumption rate at that point on the assumption that the rate for average driving is 100%.

As shown in FIG. 16, since the vehicle total mass values for the fully loaded and unloaded conditions are known and fuel consumption rates 90% and 92% for the fully loaded and unloaded conditions in target driving are found from FIGS. 13 and 14 respectively, point At for the fully loaded condition and point Bt for the unloaded condition are determined. Points At and Bt are connected by line FF and a specific point on the line corresponding to the vehicle total mass in target driving is chosen and 91% is read as the fuel consumption rate at that point on the assumption that the rate for average driving is 100%.

FIGS. 15 and 16 may be used to make an evaluation of fuel consumption for any vehicle total mass in the range from the unloaded to the fully loaded condition accurately.

For example, vehicle total mass m may be calculated as follows:

(1) Engine load (L) is read from the engine load sensor 6.

(2) For example, taking the engine torque as the engine load (L), the vehicle's driving force (tire rotating force) is calculated from the power transmission system (transmission or differential) gear ratio, the mechanical efficiency of each transmission, tire radius and the tire's friction coefficient and so on.

(3) Acceleration α is calculated from the vehicle velocity V obtained from the vehicle velocity sensor 4.

(4) The driving force F and acceleration a thus calculated are substituted into equation "m=F/α" to find vehicle total mass m.

Next, the method of evaluating fuel consumption in consideration of vehicle total mass will be explained referring to the flowchart in FIG. 17 and FIG. 9.

The control sequence shown in FIG. 17 is carried out on the premise that the onboard database 7 and the control unit (PC for analysis) 20 of the management side equipment U2 are arranged in a manner to be able to exchange data with each other by wireless communication and many types of measurement data stored in the onboard database are immediately entered into the control unit.

First, at step S1, travel data (engine speed N, accelerator opening degree α, vehicle velocity V, fuel flow rate Fw and engine load L) are read. At step S2, the onboard database 7 or management side control unit 20 decides whether the vehicle is at a stop or not. If it is at a stop (YES at step S2), the control sequence goes to step S3 or if not (NO at step S2), the sequence returns to the starting point.

At step S3, actual fuel consumption, distance traveled and fuel efficiency are calculated from the above vehicle data and the sequence goes to step S4 where vehicle total mass m is calculated by the abovementioned procedure.

At step S5, fuel consumption rate λ for actual driving is calculated for each of the driving parameters (P1-P6) on the assumption that the fuel consumption rate for average driving is 100%.

Next, at step S6, fuel consumption rate λ for target driving is calculated for each of the driving parameters (P1-P6) on the assumption that the fuel consumption rate for average driving is 100%.

The sequence proceeds to step S7 where the run is divided into running phases (E1: start acceleration phase, E2: steady running phase, E3: deceleration phase, E4: idling phase).

At step S8, driving fuel efficiency in start acceleration phase E1 is evaluated. At step S9, driving fuel efficiency in steady running phase E2 is evaluated. At step S10, driving fuel efficiency in deceleration phase E3 is evaluated. At step S11, driving fuel efficiency in idling phase E4 is evaluated.

At step S12, overall driving fuel efficiency in phases E1-E4 or from start to stop is evaluated.

At step S13, the average fuel consumption and fuel efficiency (1) (total of those for the various driving parameters) are calculated. Also at step S14, the target fuel consumption and fuel efficiency (2) (total of those for the various driving parameters) are calculated.

At step S15, the actual driving fuel consumption and fuel efficiency are compared with the results of the above calculations (1) and (2) and an evaluation of the actual driving is made.

At step S16, the various data related to fuel consumption and the evaluation of driving which have been obtained at step S15 are compiled into a report in a prescribed format, which is then printed on the printer 22 and handed to the driver concerned and the vehicle operation manager.

Then, the sequence returns to step S1 and step S1 and subsequent steps are repeated.

FIG. 18 is a radar chart showing part of a driving fuel efficiency diagnosis report as an output of the result of driving fuel efficiency evaluation. According to FIG. 18, it seems that the driver made an effort toward fuel-efficient driving on ordinary roads while considerable efforts to improve in terms of all parameters including engine speed, brake operation and running vehicle velocity should be made in driving on expressways.

Though not shown in the figure, the report can selectively show the quantity of actually consumed fuel, fuel saving as compared to average driving and how much money has been saved at that moment.

In this method, it is possible to show for each phase quantitatively and accurately, in comparison with average driving, how much fuel has been saved or wasted. Also this can be associated with the driver's way of driving.

As described above, according to the third embodiment, on the assumption that the fuel consumption rate for average driving is 100%, the fuel consumption rate for actual driving is calculated so that how much fuel has been saved or wasted in comparison with average driving or target driving can be known quantitatively and accurately.

Therefore, it is possible to concretely advise how to drive and how to improve the way of driving and show fuel consumption saving achievable by the improvement in monetary terms or in comparison with average driving or target driving, in a report handed to the driver and/or manager.

Since it is possible to know concretely how the way of driving should be improved and how much fuel can be saved by such improvement, the driver is well motivated to make an effort toward fuel-efficient driving.

The manager can know quantitatively from fuel saving data about how fuel-efficiently the driver drove the vehicle actually and make the driver's effort reflected in the evaluation of the driver. Also, concrete driving advice can be given on the basis of the database.

The level of average driving may be variable in order to suit the situation of each freight company. Likewise the level of target driving may be variable.

Next, a fourth embodiment will be described referring to FIG. 19.

In the third embodiment as shown in FIGS. 9 to 18, various parameter detecting means, namely the engine speed sensor 2, accelerator opening degree sensor 3, vehicle velocity sensor 4 and fuel flow meter 5, are connected with the onboard database 7 thorough exclusive lines respectively.

In contrast, the fourth embodiment as shown in FIG. 19 is configured so that accelerator signals, fuel flow rate signals, vehicle velocity signals and engine speed signals are collected as digital signals in a LAN repeater 8 by an in-vehicle communication network "in-vehicle LAN" and stored in an onboard database 7 through a communication cable W. Except these points, the fourth embodiment is substantially equivalent to the third embodiment shown in FIGS. 9 to 18 in all aspects including operation and effects and detailed description thereof is omitted.

Next, a fifth embodiment will be described referring to FIGS. 20 to 29.

As illustrated in FIG. 20, the fuel consumption evaluation system according to the fifth embodiment consists of equipment U1 in the vehicle (1) and equipment U2 on the management side.

The management side here refers to the vehicle management department of the freight company which owns the vehicle concerned or the like.

The vehicle equipment U1 comprises: engine speed measuring means 2 which measures engine speed N of the vehicle (truck in the figure) 1 (hereinafter the engine speed measuring means is called the engine speed sensor); accelerator opening degree measuring means 3 which measures accelerator opening degree α (hereinafter the accelerator opening degree measuring means is called the accelerator opening degree sensor); vehicle velocity measuring means 4 which measures vehicle velocity V (hereinafter the vehicle velocity measuring means is called the vehicle velocity sensor); fuel flow rate measuring means 5 which measures fuel flow rate Fw (hereinafter the fuel flow rate measuring means is called the fuel meter); engine load measuring means 6 which measures engine load L (hereinafter the engine load measuring means is called the engine load sensor); and onboard control means 10.

As shown in FIG. 21, the on board control means 10 consists of an interface 9, a control unit 11, a monitor as a display means, an onboard database 7 as a storage means and a wireless antenna 13.

The interface 9 and the onboard database 7 are connected by line L1, the onboard database 7 and the control unit 11 by line L2, the control unit 11 and the monitor 12 by line L3, and the control unit 11 and the interface 9 by line L4.

The vehicle signals for the measured engine speed N, accelerator opening degree α, vehicle velocity V, fuel flow rate Fw, and engine load L are once stored in the onboard database 7 through the interface 9 and line L4. The control unit 11 selects or extracts all or several vehicle signals from the onboard database 7 as appropriate through line L2 and sends the data through line L4, the interface 9, the wireless antenna 13 and the external network N to the management side equipment U2 which will be described later.

In this embodiment, although data exchange with the management side equipment U2 (described later) primarily takes place wirelessly, it is also possible to store the vehicle data from the onboard database 7 into the memory card 15 and transfer it from the memory card 15 to the management side.

On the other hand, the management side equipment U2 comprises: management control means 20 (hereinafter the management control means is called the personal computer for fuel efficiency data analysis); a printer 22 as an output means which outputs the result of the evaluation; and a keyboard 24 as an input means supplied with the control unit 20.

The personal computer for fuel consumption data analysis 20 receives the vehicle data through the network N and wireless antenna 23 a and calculates total mass m of the vehicle 1 in service and fuel consumption Q from the measured engine speed N, accelerator opening degree α, vehicle velocity V, fuel flow rate Fw, and engine load L and makes a comparison with the fuel consumption for average driving and that for target driving by the procedure which will be described later, in order to evaluate the way of driving and the quantity of saved fuel.

As shown in FIG. 22, the personal computer for fuel efficiency data analysis 20 divides a run from start to stop into four phases: start acceleration phase E1, steady running phase E2, deceleration phase E3, and idling phase E4.

For the four phases E1-E4, it sets parameters P1-P6 related to fuel consumption Q where P1 refers to "start acceleration shift-up engine speed N1," P2 "start acceleration accelerator opening degree α1", P3 "steady running engine speed N2", P4 "vehicle velocity (V)$^2$/distance traveled", P5 "deceleration coasting ratio" and P6 "idling velocity". It determines fuel consumption rate λ for each of the phases E1-E4 based on correlation between the parameters P1-P6 and fuel consumption rate λ against the fuel consumption rate for average driving which is assumed as 100% (the correlation is expressed by correlation line F in FIG. 24) and makes an evaluation based on the determined fuel consumption rate λ.

When the distance traveled from start to stop is not so long and the vehicle velocity is high in the period from start to stop, the ratio of energy discarded as heat by braking is large. Therefore, when the distance traveled is below a predetermined distance, "(vehicle velocity V)$^2$/distance traveled S" is used as parameter P4 (not shown), which indicates the magnitude of energy discarded as heat by braking, and P4 is evaluated in order to urge the driver to observe rules for fuel-efficient driving.

The abovementioned parameters P1-P6 are easily associated with the way of driving and accuracy is improved in the calculation of fuel consumption Q on the basis of these parameters.

A frequency distribution of travel data in connection with each of the parameters P1-P6 is nearly a normal distribution as shown in FIG. 23. By processing numerous such travel data, the average (mean value) and the degree of dispersion in the frequency distribution for each of the parameters P1-P6 can be known.

Such data is successively added to the database (not shown) in the personal computer for fuel efficiency data analysis 20 or the onboard database 7 to create a new database with improved accuracy; and also as upgraded vehicle models are introduced year by year, the database can be updated to match the performance of an upgraded vehicle 1.

The parameters except "deceleration coasting ratio" P5, namely "start acceleration shift-up engine speed N1" P1, "start acceleration accelerator opening degree α1" P2, "steady running engine speed N2" P3, "vehicle velocity (V)$^2$/distance traveled" P4 and "idling velocity" P6 are correlated with fuel consumption rate λ against the fuel consumption rate for average driving in each phase (E1-E4) which is assumed as 100%.

Fuel consumption rate λx for actual driving (actual run to be evaluated) can be calculated from the average (mean value) in the frequency distribution for each of the parameters P1-P4 and P6 (FIG. 23) and the correlation between the parameter and fuel consumption rate λ (correlation line F in FIG. 24).

Furthermore, in the frequency graph of FIG. 23, on the assumption of "target"="average−standard deviation," point Nt in the horizontal axis in FIG. 24 is found as a point corresponding to "target" for the parameter concerned (any of P1-P4 and P6) and a perpendicular line is drawn upward from Nt; then the intersection Ft of the line with the approximate expression (line F) is found to correspond to graduation λt (90% in the case shown here) on the fuel consumption rate λ scale as the vertical axis and thus this value indicates fuel consumption rate λ against the fuel consumption rate for average driving (100%).

Fuel consumption rate for actual driving λj is found by a similar calculation procedure to be 105% in the case shown here.

In this case, the fuel consumption rate for actual driving is worse than that for average driving and its comparison with the target shows that a considerable effort to improve the way of driving is required.

While the above method uses the fuel consumption rate λ expressed as a percentage to the fuel consumption rate for average driving 100% as quantitative data for fuel consumption evaluation, it is also possible to concretely calculate a target fuel efficiency and a quantity of fuel which can be saved.

Next, the procedure of calculating a target fuel efficiency and a quantity of fuel which can be saved will be explained.

The following steps are taken for each parameter (P1-P6) in each phase (E1-E4).

(1) Fuel consumption for actual driving Gj is calculated by integrating fuel flow rate signal data from the fuel meter 5 or the engine control unit (not shown).

(2) Fuel consumption for average driving Ga is calculated by multiplying the fuel consumption for actual driving Gj by fuel consumption rate for average driving (=100%) λa against fuel consumption rate for actual driving λ and then dividing the product by fuel consumption rate for actual driving λj.

$$Ga = Gj \times \lambda a / \lambda j$$

(3) Fuel consumption for target driving Gt is calculated by multiplying the fuel consumption for actual driving Gj by fuel consumption rate for target driving λt and then dividing the product by fuel consumption rate for actual driving λj.

$$Gt = Gj \times \lambda t / \lambda j$$

(4) The quantity of fuel which can be saved, namely the difference ΔG between the fuel consumption for actual driving and that for target driving is calculated by subtracting fuel consumption for target driving Gt from fuel consumption for actual driving Gj.

$$\Delta G = Gj - Gt$$

Next, the calculation results for each running phase (way of driving) are totaled to calculate the following values for a single run (from start to stop) or a single travel.

(5) Fuel saving achievable in each run (from start to stop) or travel can be calculated by taking the above steps (1)-(4) to calculate the quantity of fuel which can be saved for each driving parameter and totaling the results. Also, the quantity of fuel which can be saved in the deceleration phase is calculated from the deceleration coasting ratio and the result is added to the total.

(6) The fuel consumption for target driving is calculated by subtracting the total of quantities of fuel which can be saved for the parameters, from the actual fuel consumption.

(7) The target fuel efficiency is calculated by dividing the fuel consumption for target driving by the distance traveled.

In this way, the target fuel efficiency is calculated accurately.

The above method is valid when the total vehicle mass is equal in average driving and actual driving (actual travel)

However, in the case of commercial vehicles, particularly cargo trucks or the like, the vehicle total mass largely differs between the fully loaded condition and the unloaded condition. The fuel consumption largely depends on the vehicle total mass.

FIG. 25 is a correlation graph showing the relation between the way of driving and the fuel consumption rate in the fully loaded condition and FIG. 26 is a correlation graph showing the relation between the way of driving and the fuel consumption rate in the unloaded condition.

In the unloaded condition (FIG. 26), the fuel consumption rate for actual driving and that for target driving against average driving are 103% and 92% respectively; on the other hand, in the fully loaded condition (FIG. 25), the fuel consumption rate for actual driving is 105% and that for target driving is 90%, showing larger differences from average driving.

Here, a correlation exists between the vehicle total mass and fuel consumption rate for a given way of driving λ against average driving (100%). This correlation is expressed by an approximate expression and graphically shown in FIGS. 27 and 28 where correlation line FF in FIG. 27 represents the fuel consumption rate for actual driving and correlation line FF in FIG. 28 represents the fuel consumption rate for target driving.

As shown in FIG. 27, since the vehicle total mass values for the fully loaded and unloaded conditions are known and fuel consumption rates 105% and 103% for the fully loaded and unloaded conditions in actual driving are found from FIGS. 25 and 26 respectively, point Aj for the fully loaded condition and point Bj for the unloaded condition are determined. Points Aj and Bj are connected by line FF and a specific point on the line corresponding to the vehicle total mass in actual driving is chosen and 104% is read as the fuel consumption rate at that point on the assumption that the rate for average driving is 100%.

As shown in FIG. 28, since the vehicle total mass values for the fully loaded and unloaded conditions are known and fuel consumption rates 90% and 92% for the fully loaded and unloaded conditions in target driving are found from FIGS. 25 and 26 respectively, point At for the fully loaded condition and point Bt for the unloaded condition are determined. Points At and Bt are connected by line FF and a specific point on the line corresponding to the vehicle total mass in target driving is chosen and 91% is read as the fuel consumption rate at that point on the assumption that the rate for average driving is 100%.

FIGS. 27 and 28 may be used to make an evaluation of fuel consumption for any vehicle total mass in the range from the unloaded to the fully loaded condition accurately.

For example, vehicle total mass m can be calculated as follows:

(1) Engine load (L) is read from the engine load sensor 6.
(2) For example, taking the engine torque as the engine load (L), the vehicle's driving force (tire rotating force) is calculated from the power transmission system (transmission or differential) gear ratio, the mechanical efficiency of each transmission, tire radius and the tire's friction coefficient and so on.
(3) Acceleration α is calculated from the vehicle velocity V obtained from the vehicle velocity sensor 4.
(4) The driving force F and acceleration a thus calculated are substituted into equation "m=F/α" to find vehicle total mass m.

Next, the method of evaluating fuel consumption in consideration of vehicle total mass will be explained referring to the flowchart in FIG. 29 and FIG. 20.

First, at step S1, travel data (engine speed N, accelerator opening degree α, vehicle velocity V, fuel flow rate Fw and engine load L) are read.

The sequence proceeds to step S2 where the instantaneous accelerator opening degree is displayed on the monitor 12 of the onboard control means 10 and further the instantaneous fuel efficiency is displayed (step S3).

FIG. 30 shows a display (monitor) screen Md1 appearing during a run, which includes an accelerator opening degree meter M11, an instantaneous fuel efficiency meter M12, a current fuel efficiency meter M13, a target fuel efficiency meter M14 and an achievement ratio meter M15 which indicates the ratio of the current fuel efficiency to the target fuel efficiency, and a fuel saving meter M16 which indicates the quantity of fuel which can be saved.

At step S4, the control unit 11 of the onboard control means 10 decides whether the vehicle is at a stop or not. If it is at a stop (YES at step S2), the sequence goes to step S5 and if not (NO at step S2), the sequence returns to the starting point.

At step S5, actual fuel consumption, distance traveled and fuel efficiency are calculated from the above vehicle data and the sequence goes to step S6 where vehicle total mass m is calculated by the abovementioned procedure.

At step S7, fuel consumption rate λ for actual driving is calculated for each of the driving parameters (P1-P6) on the assumption that the fuel consumption rate for average driving is 100%.

Next, at step S8, fuel consumption rate λ for target driving is calculated for each of the driving parameters (P1-P6) on the assumption that the fuel consumption rate for average driving is 100%.

The sequence proceeds to step S9 where the run is divided into running phases (E1: start acceleration phase, E2: steady running phase, E3: deceleration phase, E4: idling phase).

At step S10, driving fuel efficiency in start acceleration phase E1 is evaluated.

As a real time advice display Md2 which appears during a run, FIG. 31 shows the accelerator opening degree meter M11, instantaneous fuel efficiency meter M12 and advice message "Ease up on accelerator" Ma1.

As a real time advice display Md3 which appears during another run, FIG. 32 shows the accelerator opening degree meter M11, instantaneous fuel efficiency meter M12 and advice message "Shift up!" Ma2 because the engine speed is insufficient for shift-up.

At step S11, driving fuel efficiency in steady running phase E2 is evaluated; at step S12, driving fuel efficiency in deceleration phase E3 is evaluated; then at step S13, driving fuel efficiency in idling phase E4 is evaluated.

As a real time advice display Md4 which appears during a run in these phases, FIG. 33 shows the accelerator opening degree meter M11 (accelerator opening degree zero), instantaneous fuel efficiency meter M12 and advice message "Use coasting as much as possible" Ma3.

At step S14, overall driving fuel efficiency in phases E1-E4 or from start to stop is evaluated.

At step S15, the average fuel consumption and fuel efficiency (1) (total of those for the various driving parameters) are calculated. Also at step S16, the target fuel consumption and fuel efficiency (2) (total of those for the various driving parameters) are calculated.

At step S17, the actual driving fuel consumption and fuel efficiency are compared with the results of the above calculations (1) and (2) and an evaluation of the actual driving is made.

FIGS. 34 and 35 respectively show display screens Ms1 and Ms2 which appear each time when the vehicle stops.

By pushing a panel switch Sw in the top left corner, the screen toggles (from the screen in FIG. 34 to the one in FIG. 35 and vice versa).

In FIG. 34, the accelerator opening degree M21, shift-up engine speed M22, steady running engine speed M23 and coasting utilization M24 and running vehicle velocity M25 are shown in the form of a percentage bar graph with 100% as the full achievement of the target.

In FIG. 35, which shows a fuel saving tip, the advice message "Avoid a heavy foot on accelerator!" Ma4 and the average accelerator opening degree M31 (combined with a target value) and fuel consumption M32 are displayed digitally. Change in the rating of driving M33 every 10 km up to 50 km is shown in the form of a bar graph.

At step S18, the various data related to fuel consumption and the evaluation of driving which have been obtained at step S17 are compiled into a report in a prescribed format, which is then printed on the printer 22 and handed to the driver concerned and the vehicle operation manager.

Then, the sequence returns to step S1 and step S1 and subsequent steps are repeated.

FIG. 36 shows a driving fuel efficiency diagnosis report R as an output of the result of driving fuel efficiency evaluation.

The report R in FIG. 36 includes a radar chart R1, an overall rating section R2, fuel saving advice sections R3 and R4, a fuel saving graph section R5, and a general comment section R6.

The radar chart R1 includes eight evaluation parameters: accelerator operation r1, shift-up operation r2, vehicle velocity r3, engine speed r4, brake operation r5, vehicle velocity on expressways r6, brake operation on expressways r7, and vehicle speed change on expressways r8. In the case shown here, a ten-level evaluation is made with Level 10 as excellent and Level 0 as worst.

The overall rating table for fuel consumption R2 indicates, in a tabular form, estimated standard fuel consumption, fuel saving in liters and monetary saving for ordinary roads and those for expressways and totals for both.

The fuel saving advice section R3 shows the vehicle velocity of the past travel, its influence on fuel efficiency, a tip for further fuel saving and so on.

The fuel saving advice section R4 shows, for example, whether the accelerator is operated in start acceleration properly or not, its influence on fuel efficiency, a tip for further fuel saving and so on.

The fuel saving graph section R5 shows the actually achieved fuel saving in liters as numerical data in comparison with target fuel saving for each driving parameter in the form of a bar graph.

The general comment section R6 shows a general comment on the way of driving.

As an evaluation for a single parameter, for example, data on comparison D in the accelerator opening degree for start acceleration between target driving d1 and actual driving d2 can be indicated as shown in FIG. 37.

As described above, according to the fifth embodiment, it is possible to calculate, for each phase, quantitatively and accurately how much fuel has been saved or wasted in comparison with average driving. Also this can be associated with the driver's way of driving.

On the assumption that the fuel consumption rate for average driving is 100%, the fuel consumption rate for actual driving is calculated so that how much fuel has been saved or wasted in comparison with average driving or target driving can be known quantitatively and accurately.

Since an evaluation of fuel consumption is shown on the onboard display means (monitor 12) in real time, it is possible for the driver to learn fuel-efficient driving through OJT (on the job training).

Therefore, it is possible to concretely advise how to drive and how to improve the way of driving and show fuel consumption saving achievable by the improvement in monetary terms or in comparison with average driving or target driving, in a report handed to the driver and/or manager.

Since how the way of driving should be improved and how much fuel can be saved by such improvement are shown on the monitor 12 in real time, the driver is well motivated to make an effort toward fuel-efficient driving.

Since not only an absolute value of fuel consumption is shown but also comparison against average driving and target driving is made parameter by parameter, the evaluation is easy to understand and realistic measures to improve fuel efficiency (promote fuel-efficient driving) can be taken immediately.

The manager can know quantitatively from fuel saving data about how fuel-efficiently the driver drove the vehicle actually and make the driver's effort reflected in the evaluation of the driver. Also, concrete driving advice can be given on the basis of the database.

The level of average driving may be variable in order to suit the situation of each freight company. Likewise the level of target driving may be variable.

Next, a sixth embodiment will be described referring to FIG. 38.

In the fifth embodiment as shown in FIGS. 20 to 37, various parameter detecting means, namely the engine speed sensor 2, accelerator opening degree sensor 3, vehicle velocity sensor 4 and fuel flow meter 5, are connected with the onboard database 7 thorough their exclusive lines respectively.

In contrast, the sixth embodiment as shown in FIG. 38 is configured so that accelerator signals, fuel flow rate signals, vehicle velocity signals and engine speed signals are collected as digital signals in a LAN repeater 8 by an in-vehicle communication network "in-vehicle LAN" and stored in an onboard database 7 through a communication cable W. Except these points, the sixth embodiment is substantially equivalent to the fifth embodiment shown in FIGS. 20 to 37 in all aspects including operation and effects and detailed description thereof is omitted.

The embodiments shown here are merely examples and do not limit the technical scope of the present invention.

BRIEF DESCRIPTION OF THE DRAWINGS

FIG. 4 is a frequency distribution graph which shows frequency distribution for evaluation parameters according to the invention.

FIG. 5 is a correlation chart showing the correlation between each evaluation parameter and fuel consumption per unit distance traveled.

FIG. 6 is a table summarizing the method of calculating fuel consumption.

FIG. 17 is a control flowchart explaining the fuel consumption evaluation sequence according to the first embodiment.

DESCRIPTION OF REFERENCE NUMERALS

Figure 1:
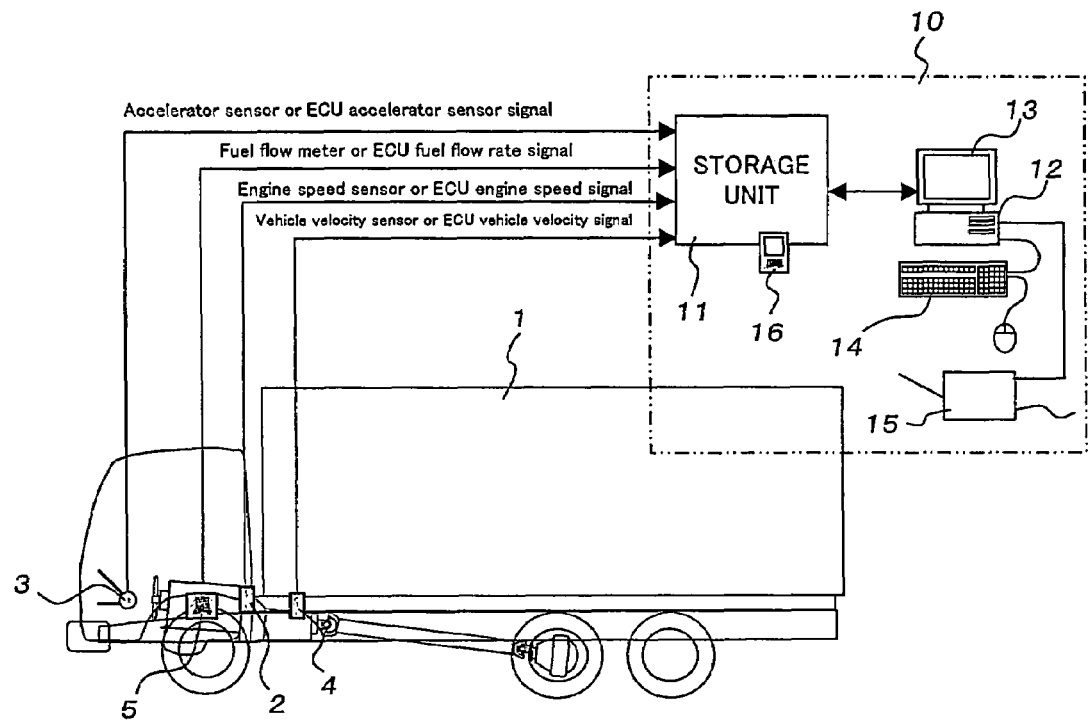
FIG. 1 is a block diagram showing a fuel consumption evaluation system configuration according to the first embodiment of the invention.
Figure 8:
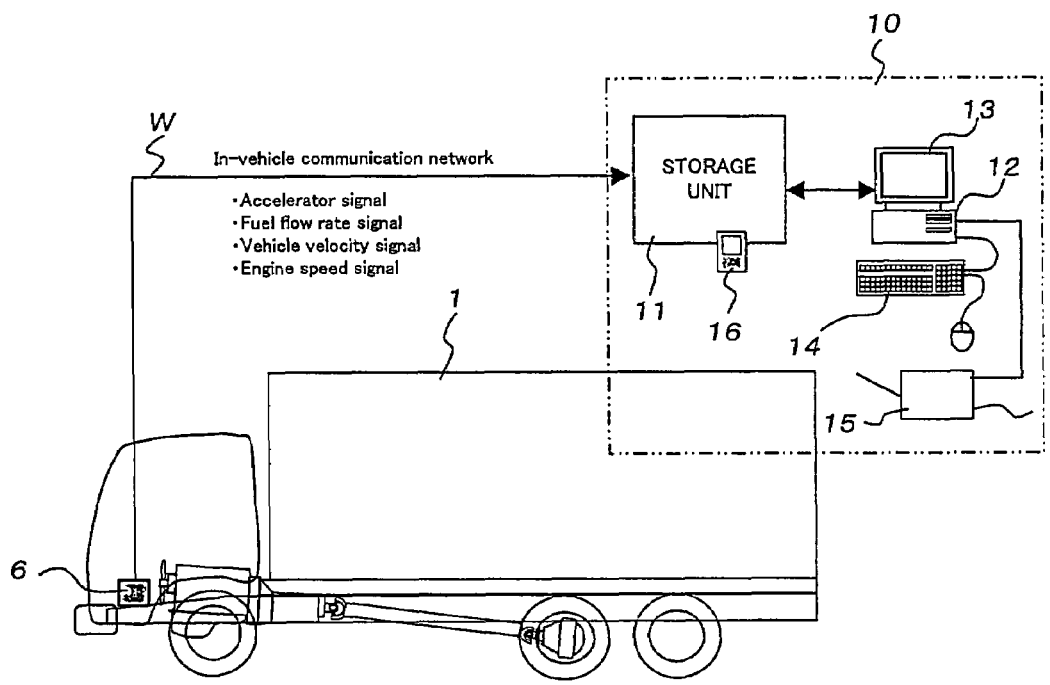
FIG. 8 is a block diagram showing a fuel consumption evaluation system configuration according to the second embodiment of the invention.
Figure 2:
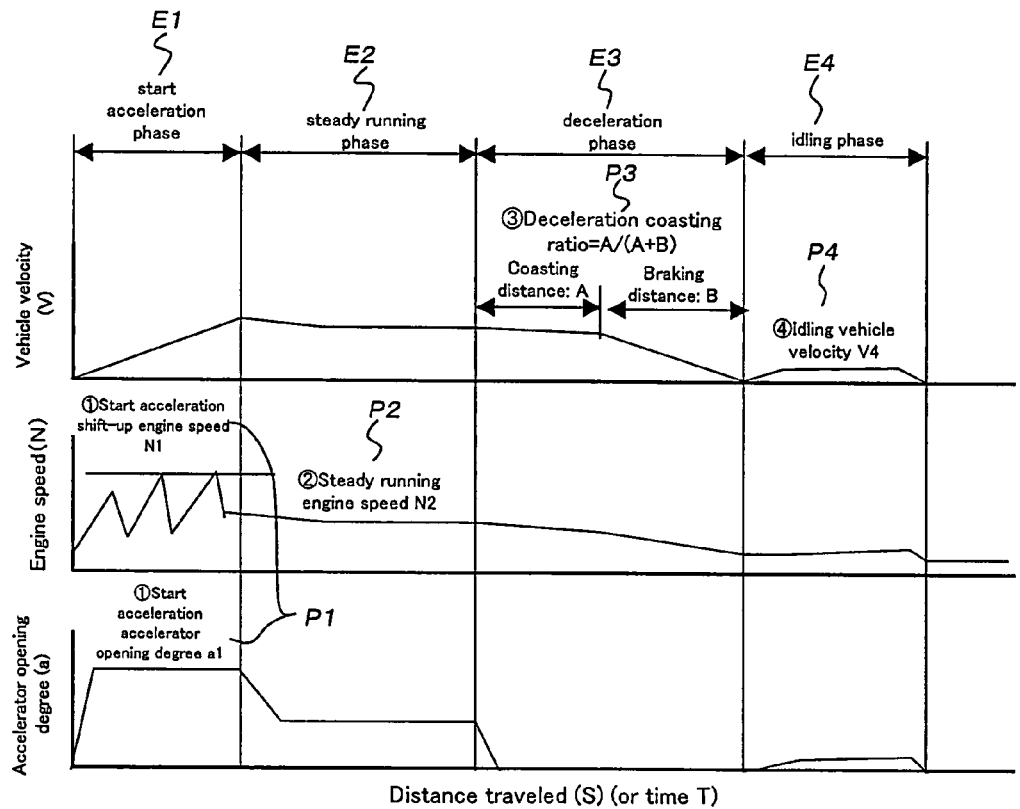
FIG. 2 is a characteristic chart in which a run is divided into four phases and various parameters are correlated with distance traveled (running phases) according to the invention.
Figure 3:
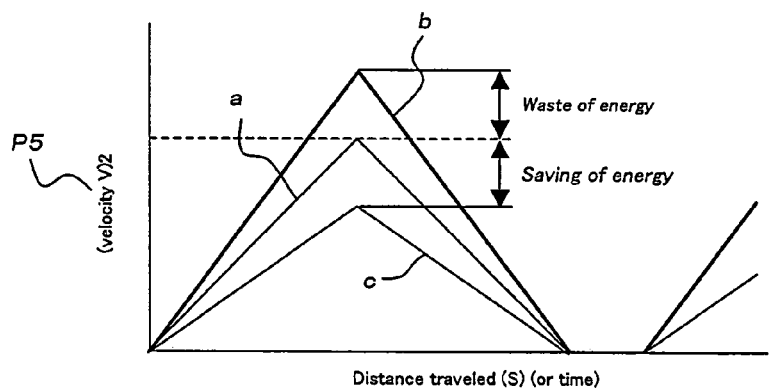
FIG. 3 is a chart explaining the magnitude of vehicle velocity as the magnitude of kinetic energy.
Figure 7:
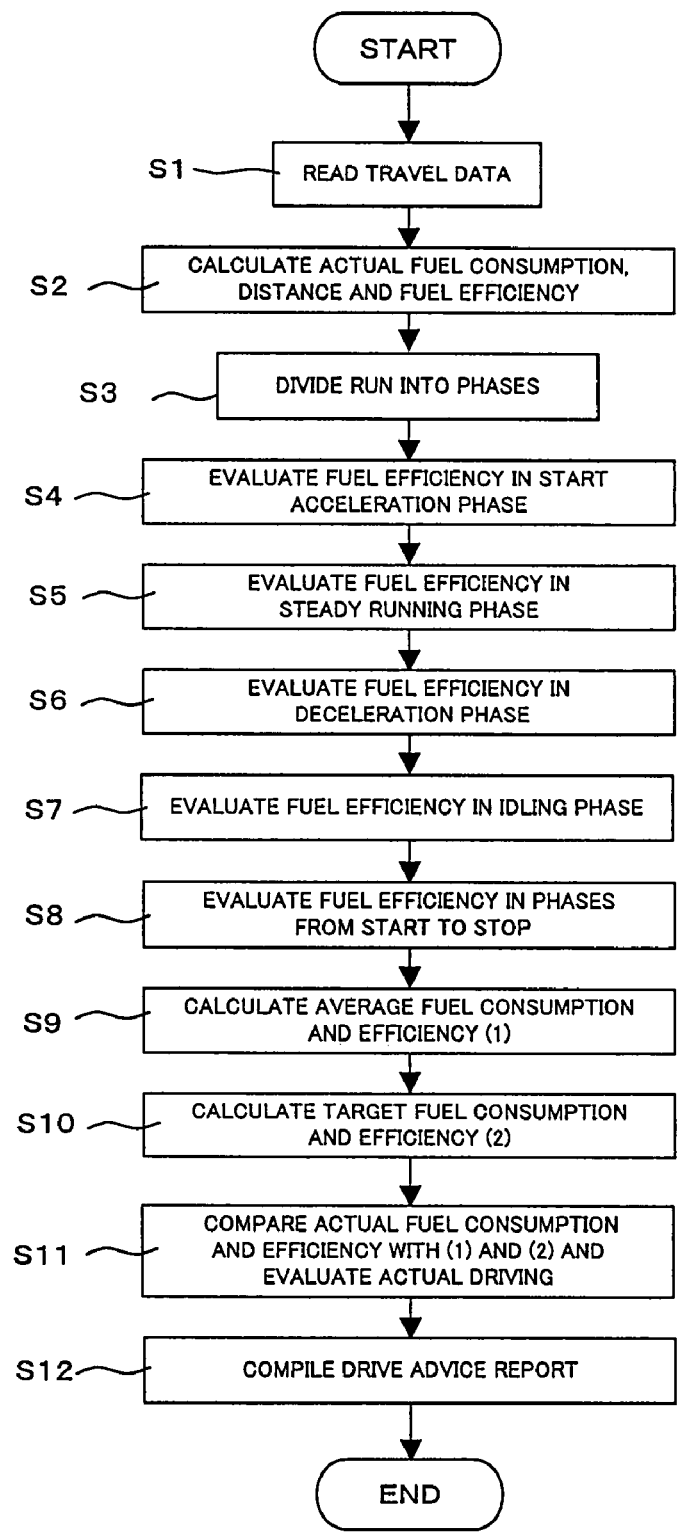
FIG. 7 is a flowchart showing an evaluation sequence according to the invention.
Figure 9:
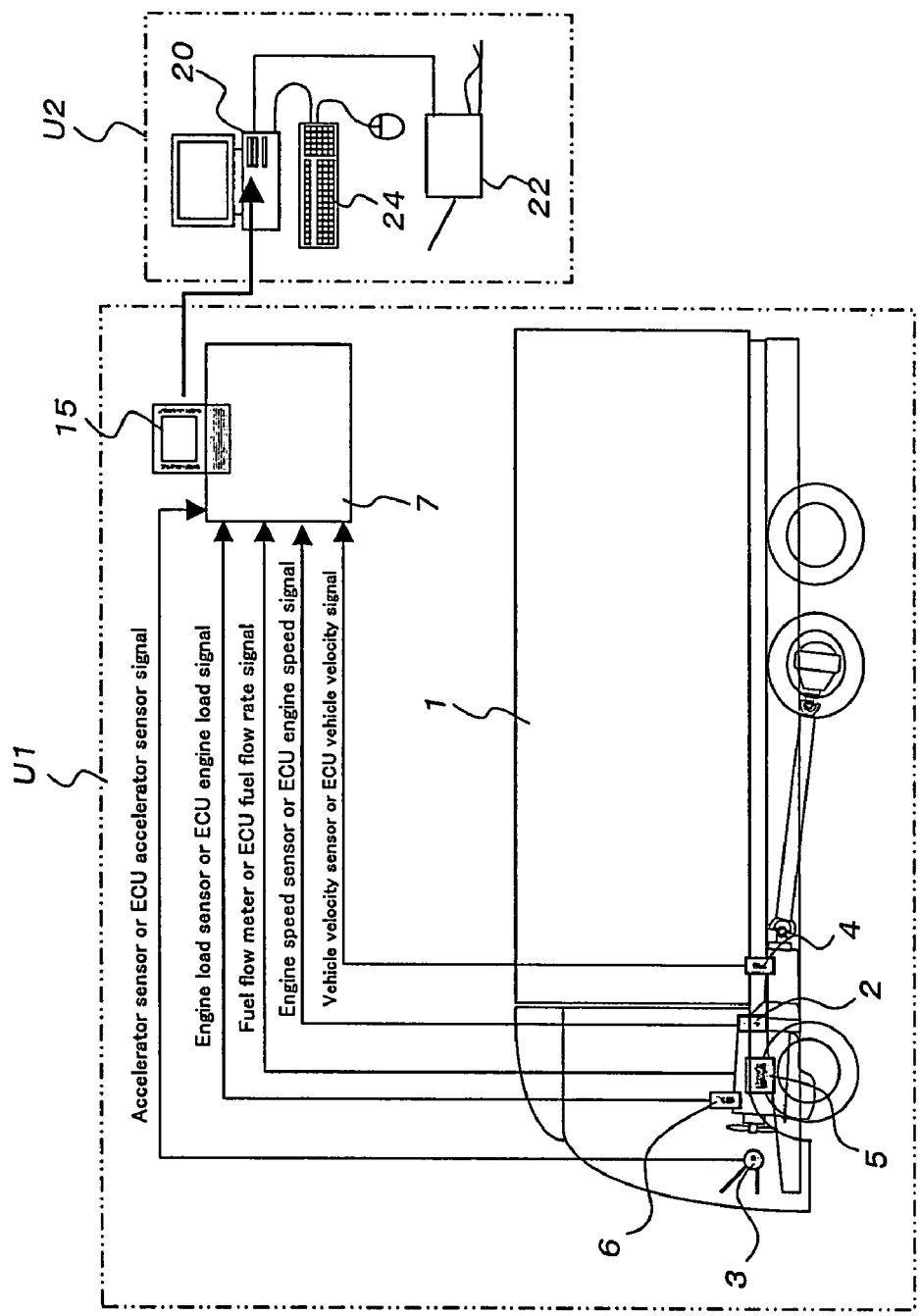
FIG. 9 is a block diagram showing a fuel consumption evaluation system configuration according to the third embodiment of the invention.
Figure 10:
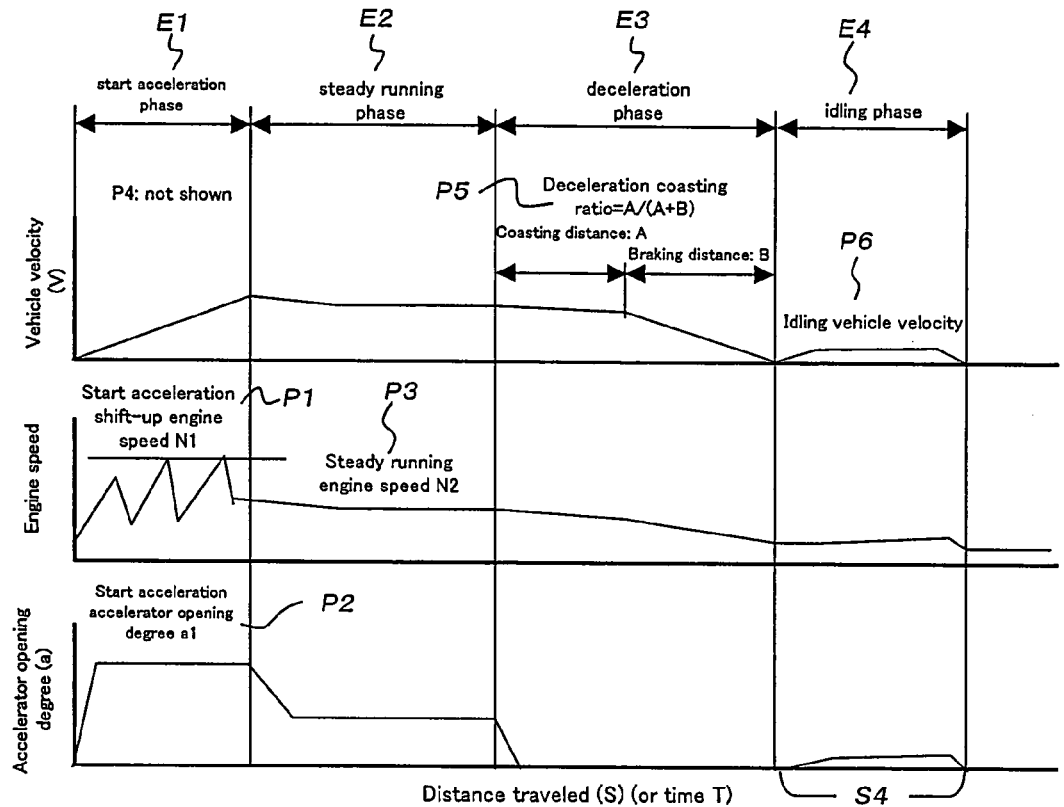
FIG. 10 is a characteristic chart in which a run is divided into four phases and various parameters are correlated with distance traveled (running phases) according to the third embodiment of the invention.
Figure 11:
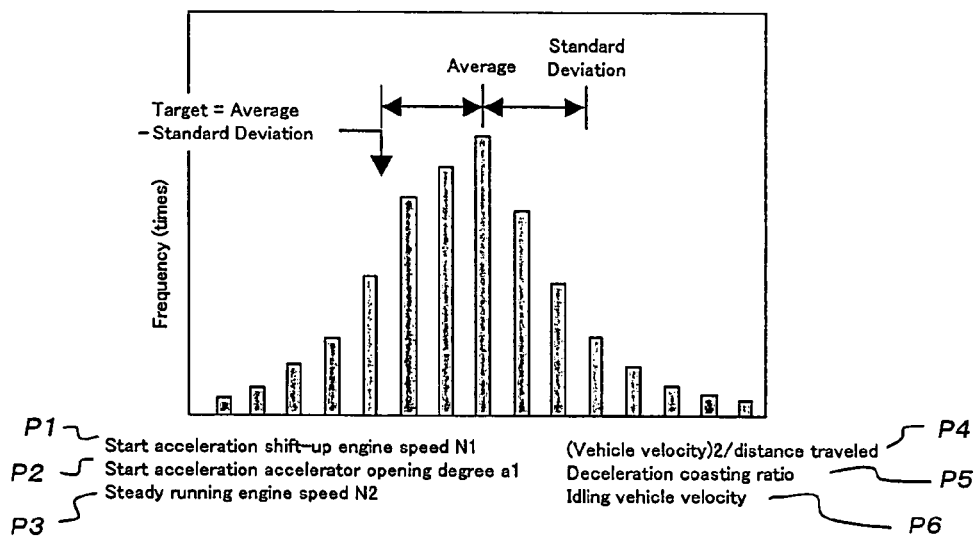
FIG. 11 is a frequency distribution graph which shows frequency distribution for evaluation parameters in the third embodiment.
Figure 18:
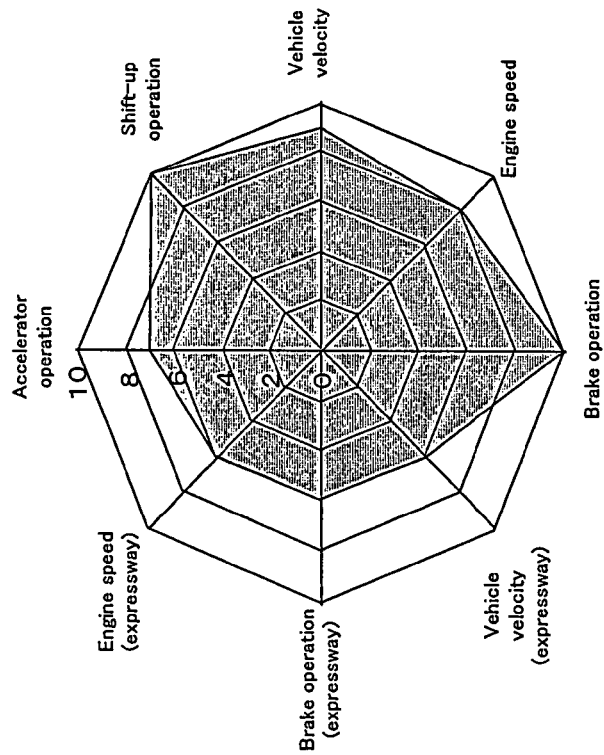
FIG. 18 is a radar chart showing part of a driving fuel efficiency diagnosis report outputted as a summary of driving fuel efficiency evaluation.
Figure 12:
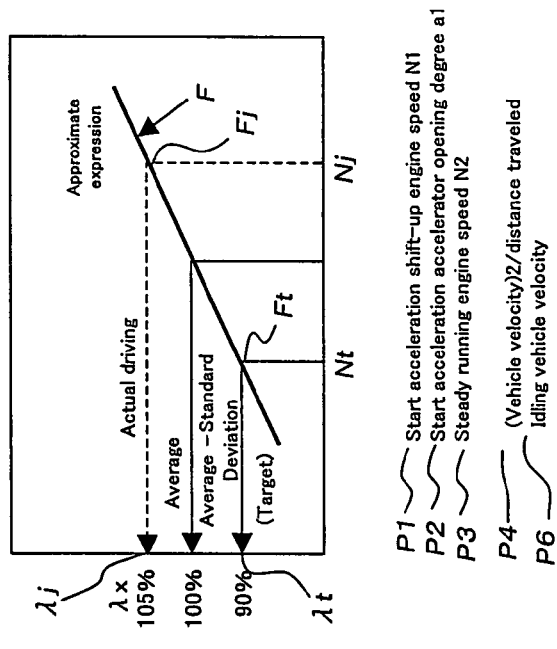
FIG. 12 is a correlation chart showing the correlation between each evaluation parameter and fuel consumption rate $\lambda$ for a given way of driving against the fuel consumption rate for average driving which is assumed as 100%.
Figure 14:
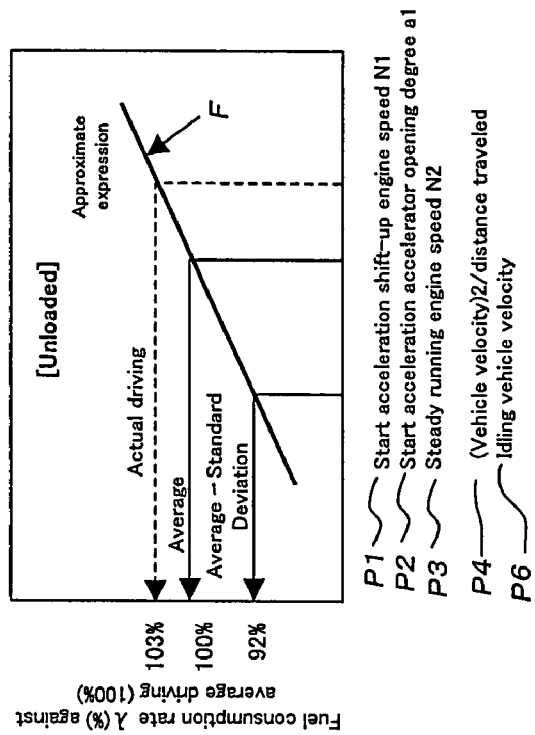
FIG. 14 is a correlation chart showing the correlation between each evaluation parameter and fuel consumption rate $\lambda$ for a given way of driving in the unloaded condition against the fuel consumption rate for average driving which is assumed as 100%.
Figure 13:
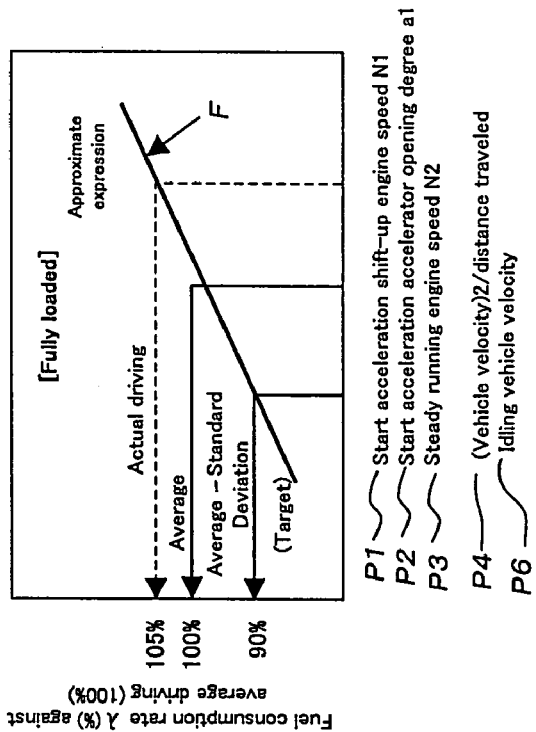
FIG. 13 is a correlation chart showing the correlation between each evaluation parameter and fuel consumption rate $\lambda$ for a given way of driving in the fully loaded condition against the fuel consumption rate for average driving which is assumed as 100%.
Figure 16:
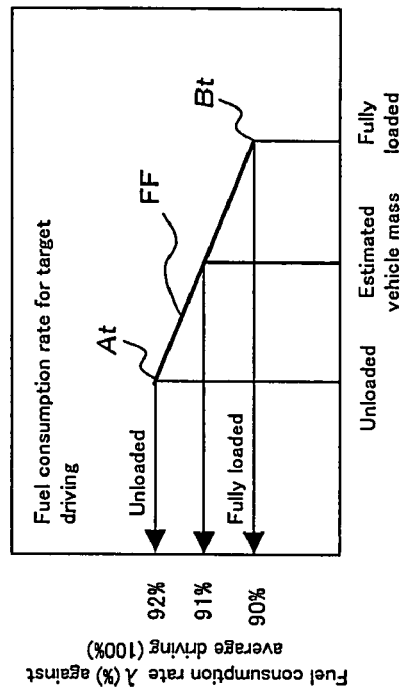
FIG. 16 is a correlation chart showing fuel consumption rate for target driving with a given vehicle total mass.
Figure 15:
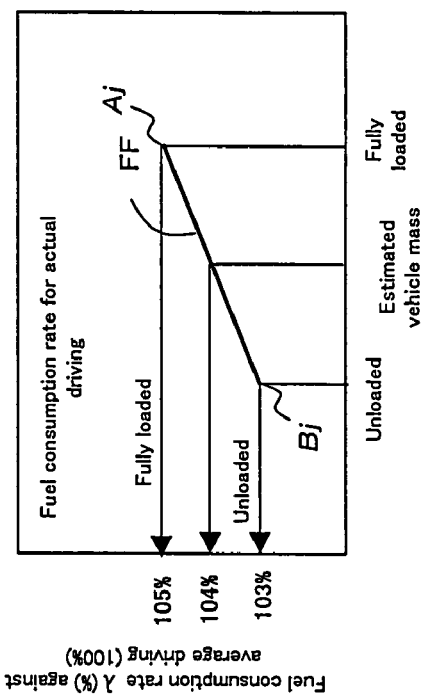
FIG. 15 is a correlation chart showing fuel consumption rate for actual driving with a given vehicle total mass.
Figure 19:
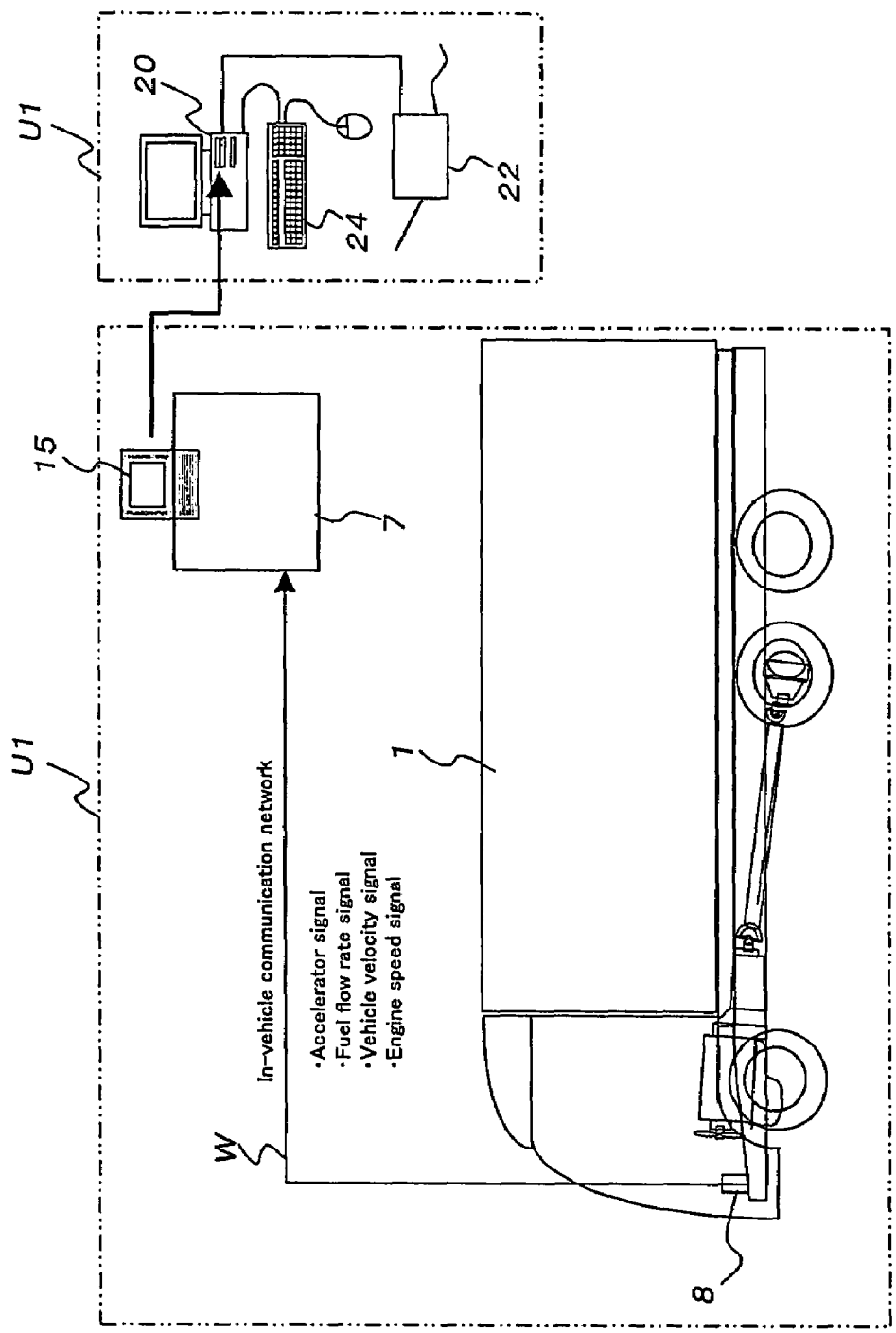
FIG. 19 is a block diagram showing the general configuration of the fourth embodiment.
Figure 20:
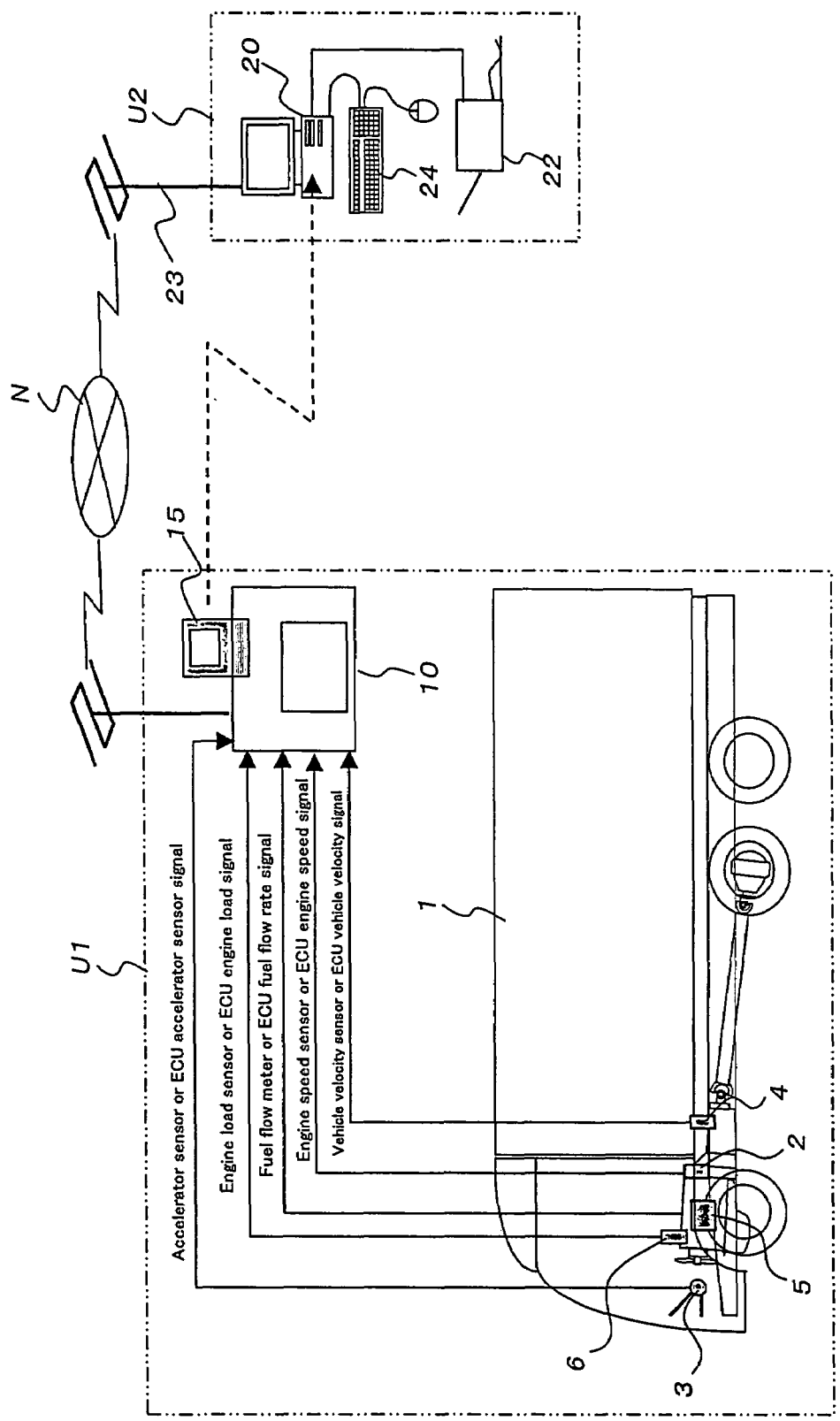
FIG. 20 is a block diagram showing a fuel consumption evaluation system configuration according to the fifth embodiment of the invention.
Figure 21:
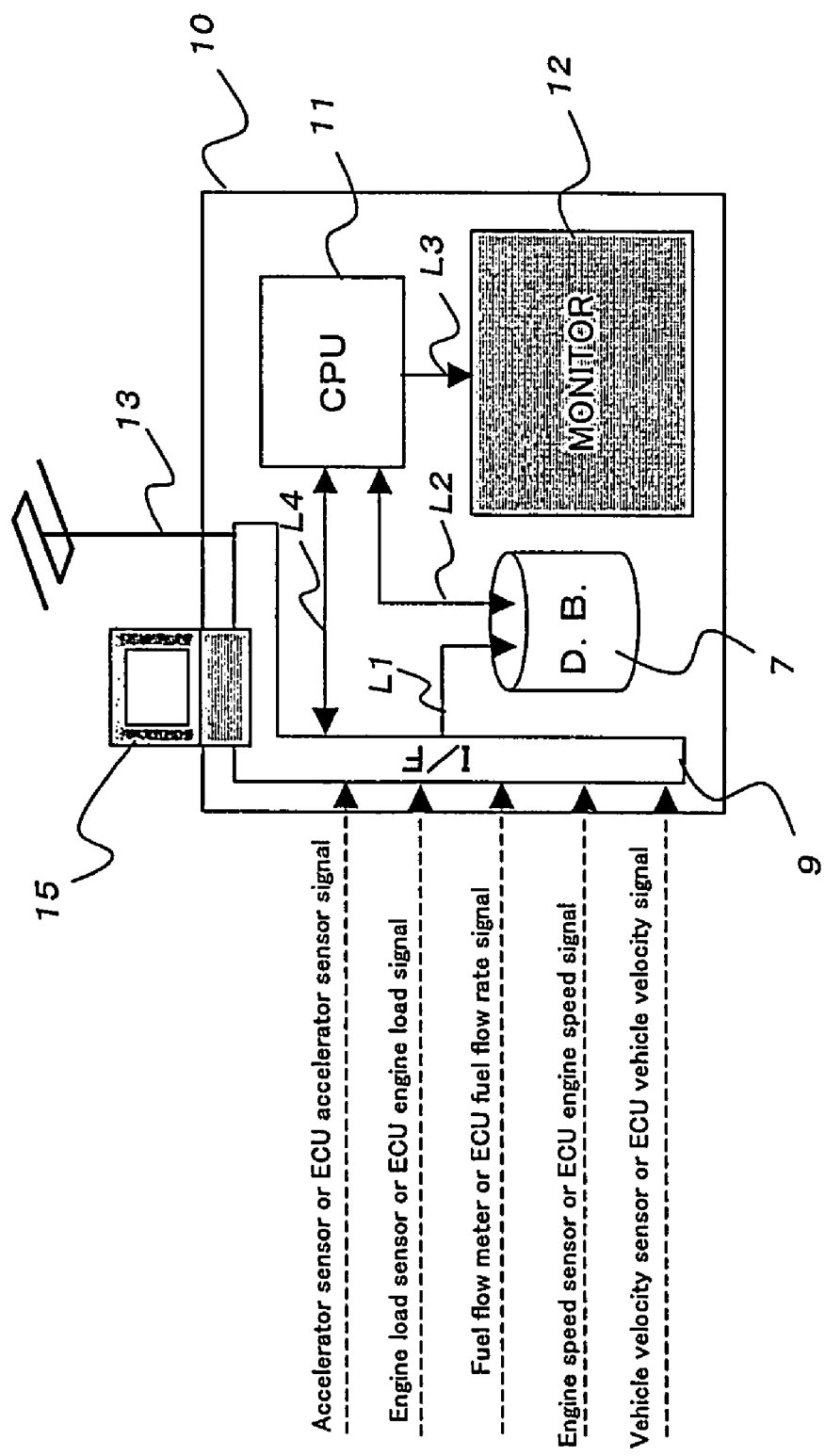
FIG. 21 is a block diagram showing the configuration of the vehicle control means in the fifth embodiment.
Figure 22:
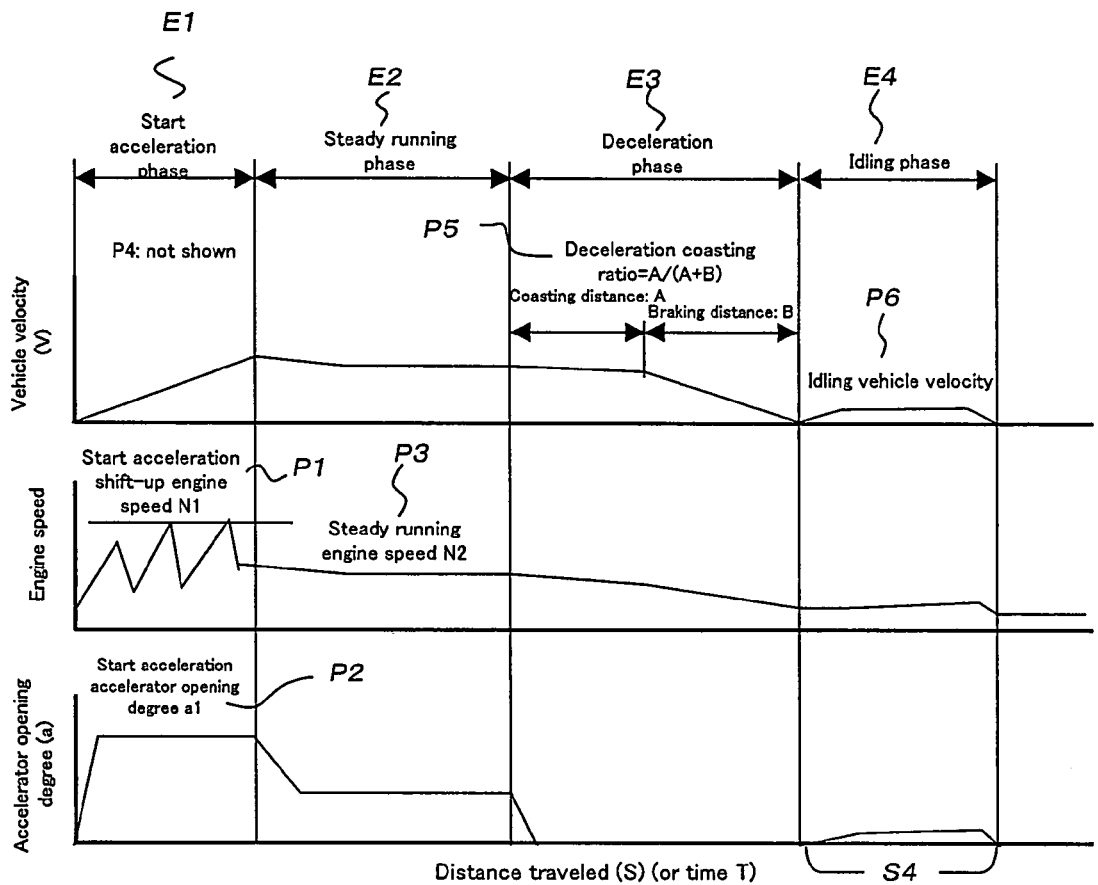
FIG. 22 is a characteristic chart in which a run is divided into four phases and various parameters are correlated with distance traveled (running phases) according to the fifth embodiment.
Figure 23:
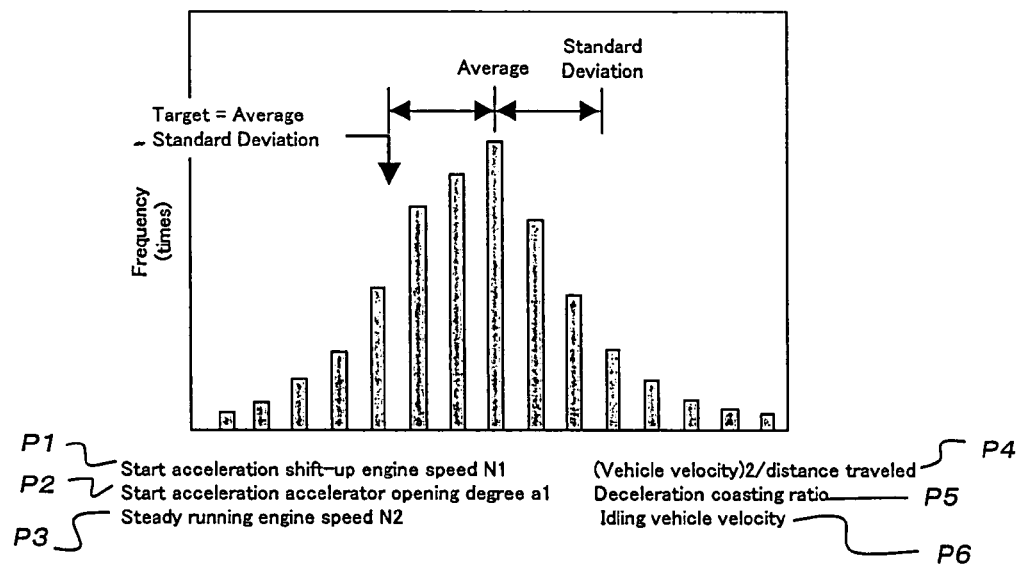
FIG. 23 is a frequency distribution graph which shows frequency distribution for evaluation parameters in the fifth embodiment.
Figure 37:
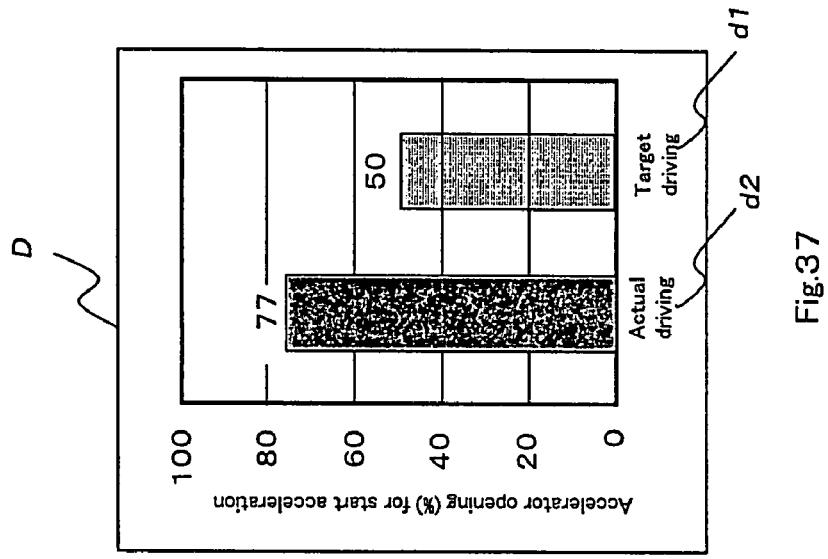
FIG. 37 shows output data on comparison in the accelerator opening degree for start acceleration between target driving and actual driving as an evaluation for a single parameter in the fifth and sixth embodiments.
Figure 24:
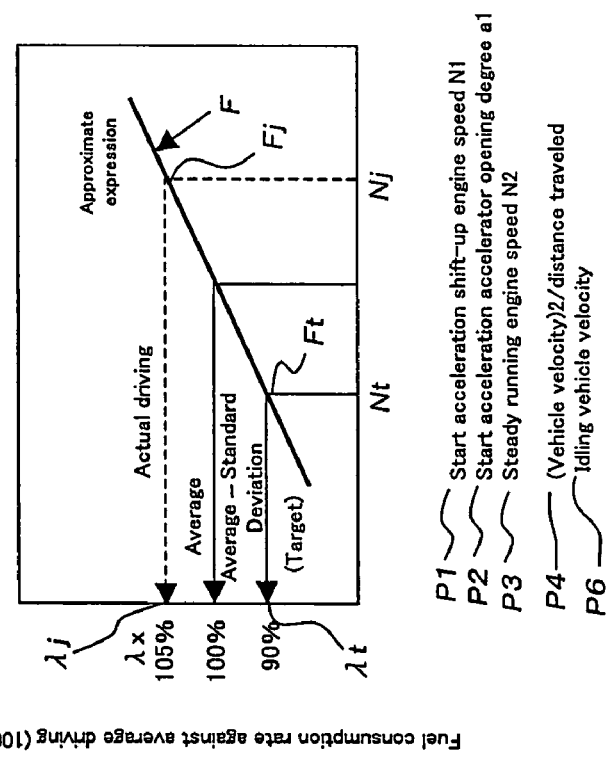
FIG. 24 is a correlation chart showing the correlation between each evaluation parameter and fuel consumption rate $\lambda$ for a way of driving against the fuel consumption rate for average driving which is assumed as 100%.
Figure 26:
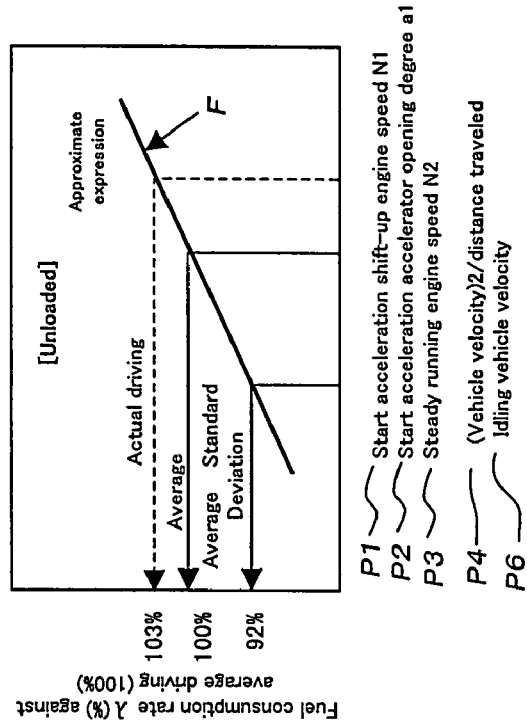
FIG. 26 is a correlation chart showing the correlation between each evaluation parameter and fuel consumption rate $\lambda$ for a given way of driving in the unloaded condition against the fuel consumption rate for average driving which is assumed as 100%.
Figure 25:
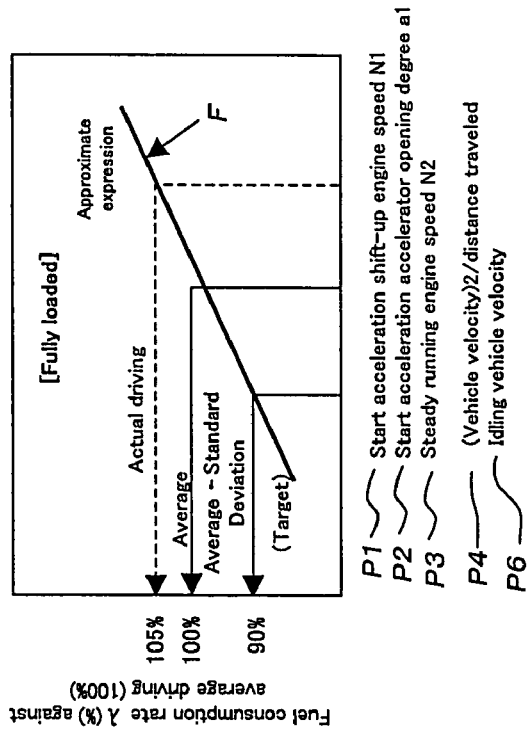
FIG. 25 is a correlation chart showing the correlation between each evaluation parameter and fuel consumption rate $\lambda$ for a given way of driving in the fully loaded condition against the fuel consumption rate for average driving which is assumed as 100%.
Figure 28:
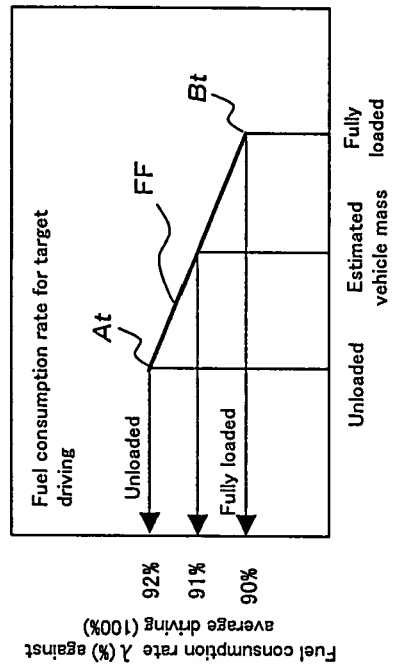
FIG. 28 is a correlation chart showing fuel consumption rate for target driving with a given vehicle total mass.
Figure 27:
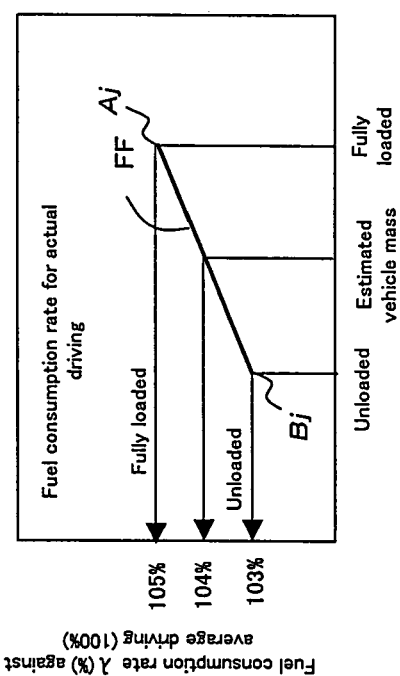
FIG. 27 is a correlation chart showing fuel consumption rate for actual driving with a given vehicle total mass.
Figure 29:
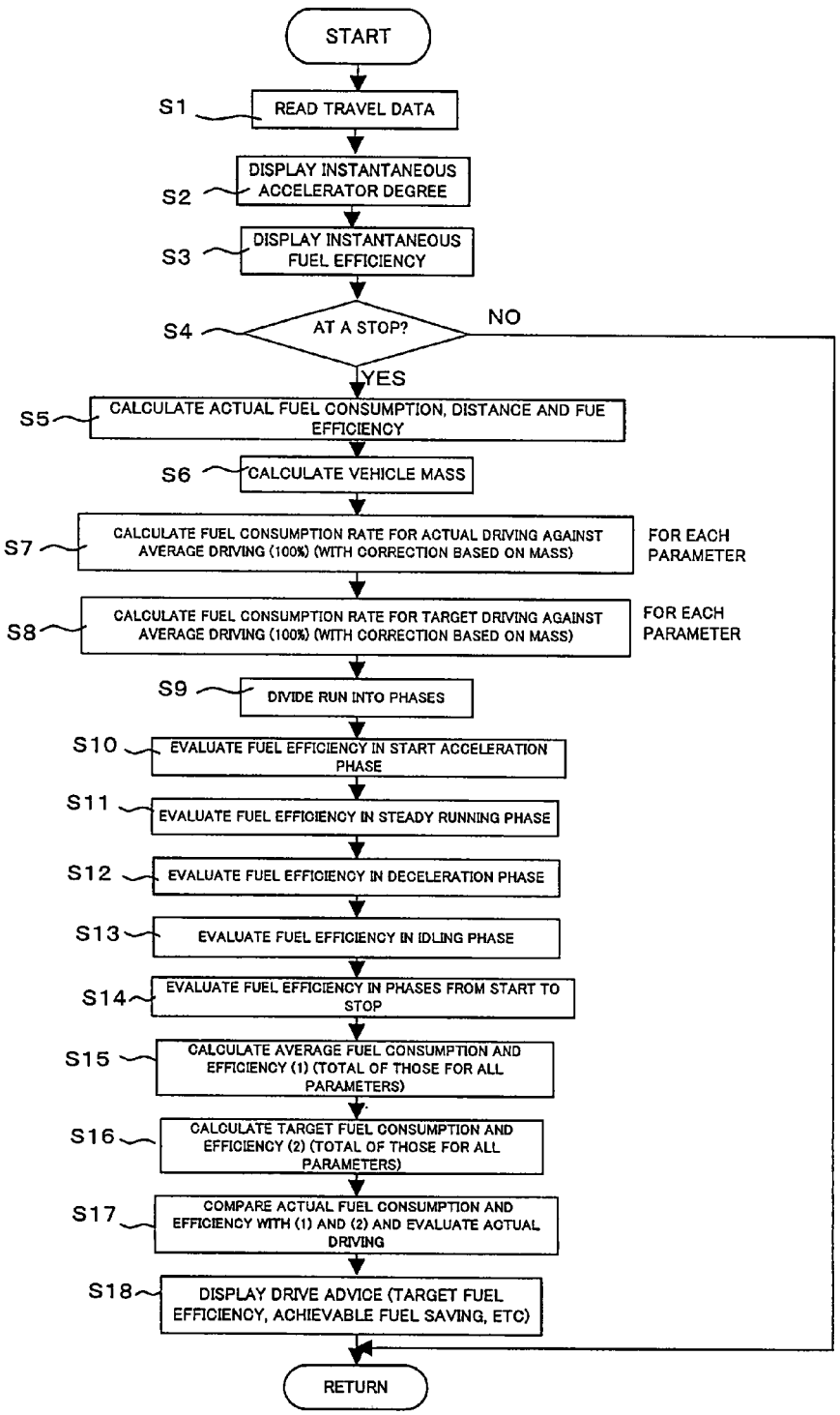
FIG. 29 is a control flowchart explaining the fuel consumption evaluation sequence according to the fifth embodiment.
Figure 30:
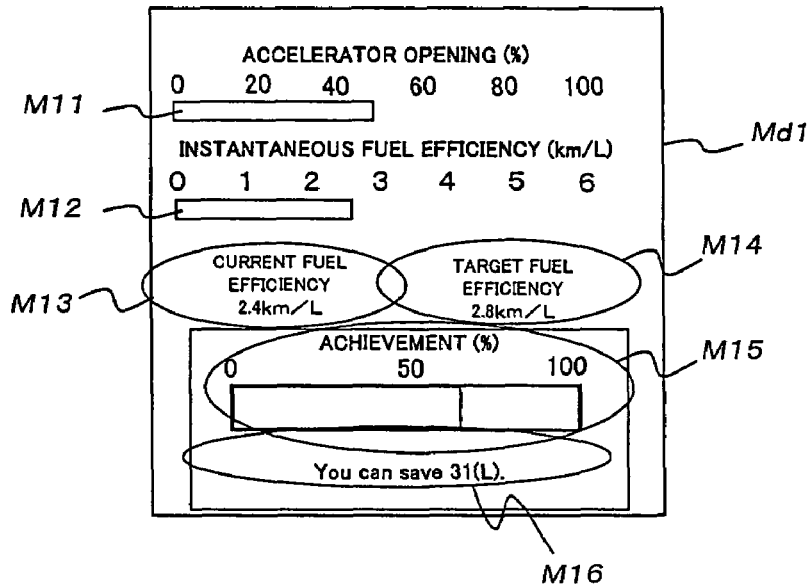
FIG. 30 shows a display screen appearing during a run in the fifth and sixth embodiments.
Figure 31:
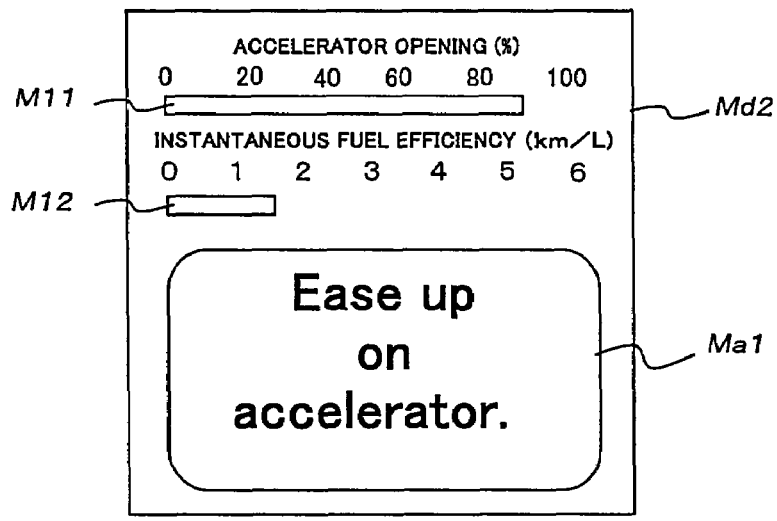
FIG. 31 shows a real time information display screen appearing during a run in the fifth and sixth embodiments.
Figure 32:
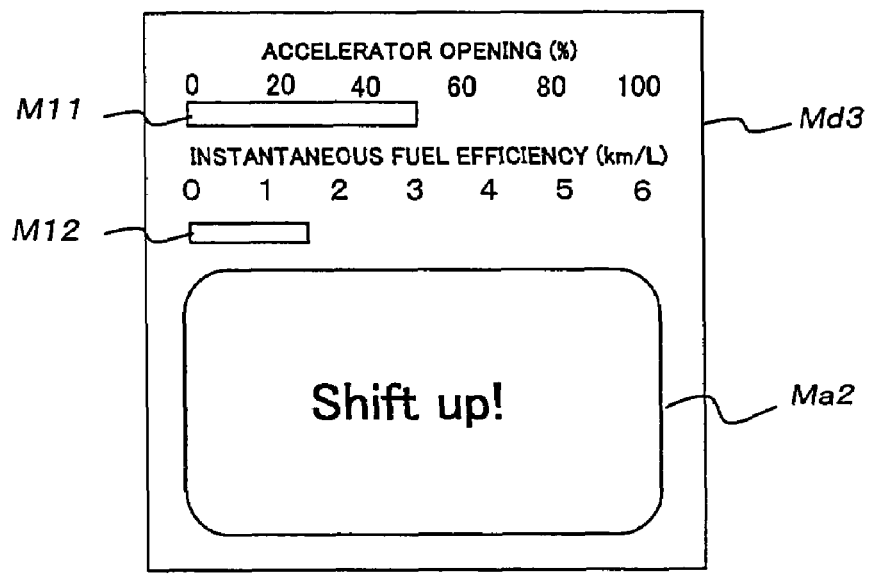
FIG. 32 shows another real time information display screen appearing during a run in the fifth and sixth embodiments.
Figure 33:
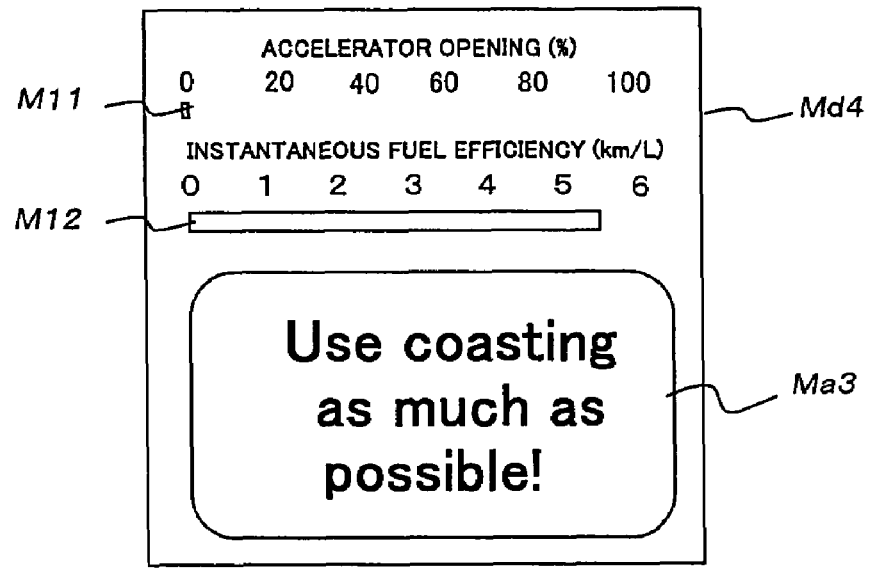
FIG. 33 shows another real time information display screen appearing during a run in the fifth and sixth embodiments.
Figure 34:
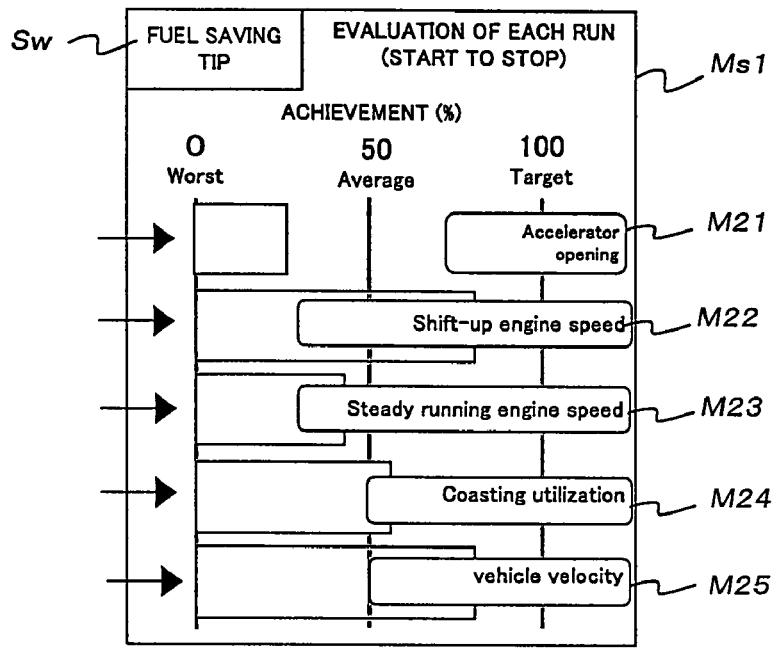
FIG. 34 shows a display screen appearing during a stop in the fifth and sixth embodiments.
Figure 35:
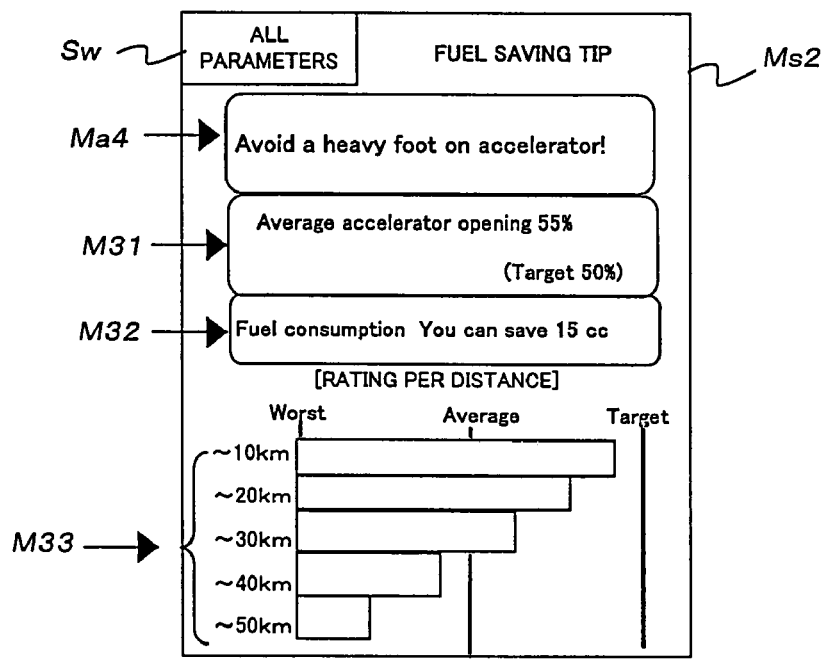
FIG. 35 shows another display screen appearing during a stop in the fifth and sixth embodiments.
Figure 36:
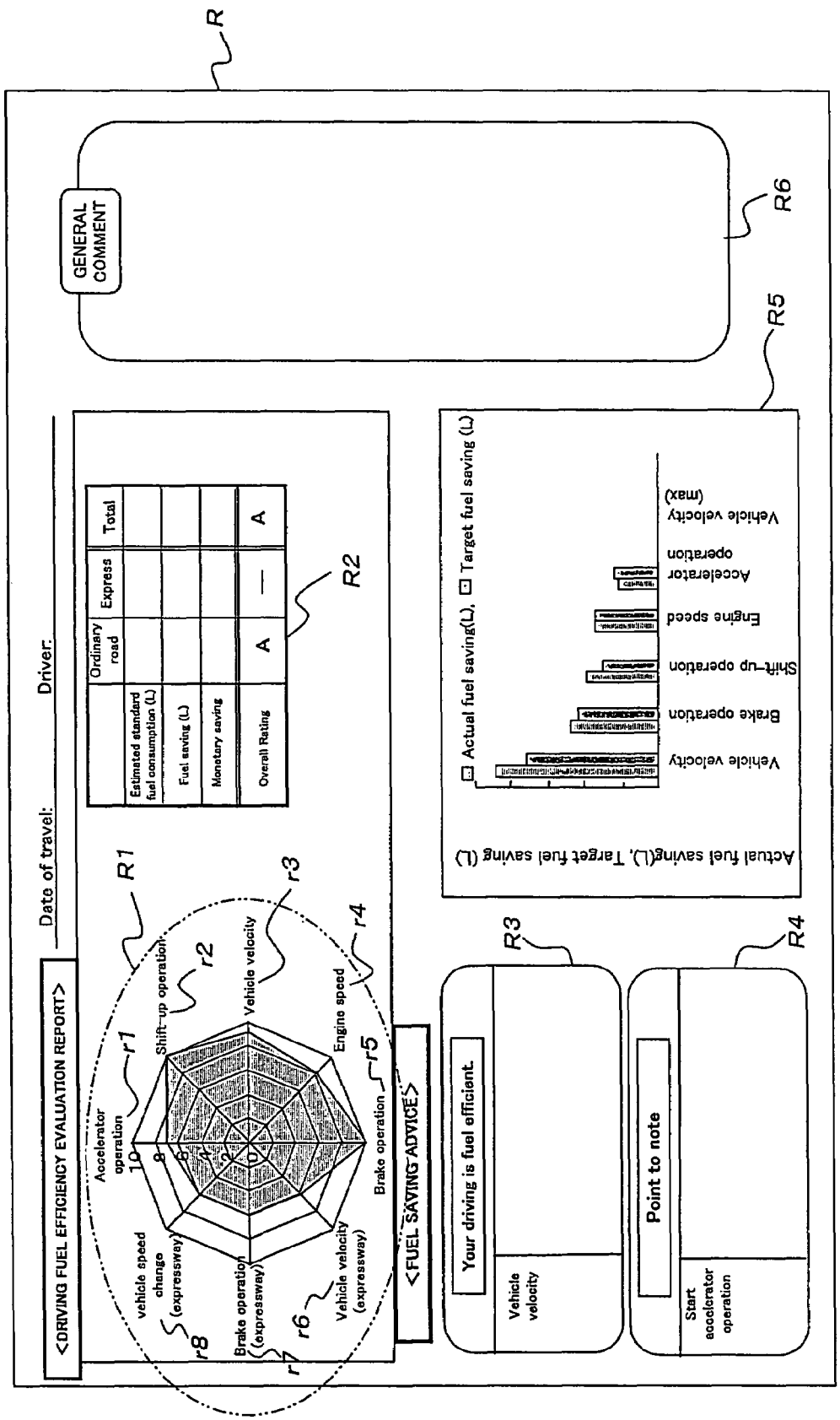
FIG. 36 shows a driving fuel efficiency diagnosis report outputted as a summary of driving fuel efficiency evaluation in the fifth and sixth embodiments.
Figure 38:
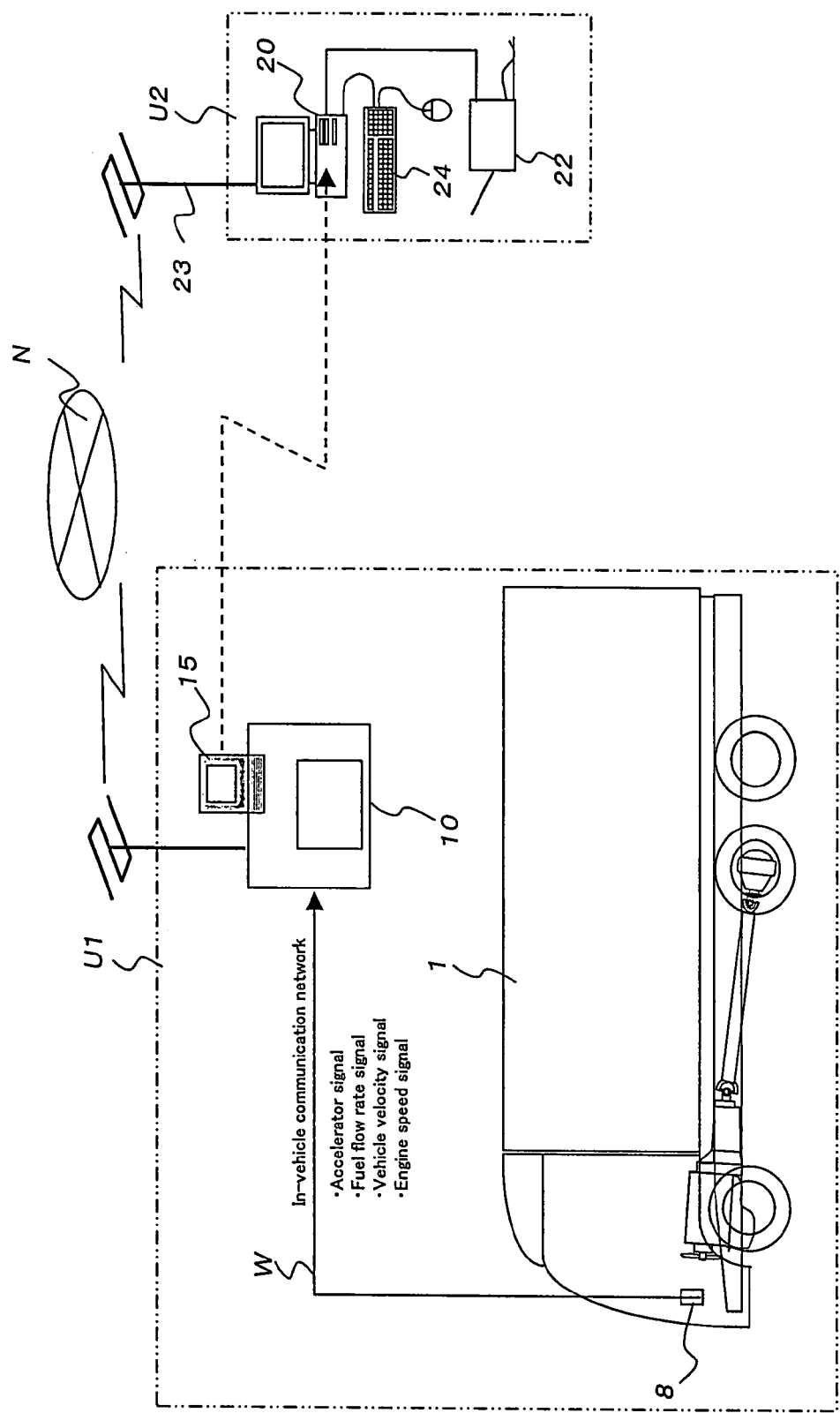
FIG. 38 is a block diagram showing the general configuration of the sixth embodiment.

1. Motor truck (first and second embodiments)/Vehicle (third to sixth embodiments)
2. Engine speed measuring means/Engine speed sensor (first to sixth embodiments)
3. Accelerator opening degree measuring means/Accelerator opening degree sensor (first to sixth embodiments)
4. Vehicle velocity measuring means/Vehicle velocity sensor (first to sixth embodiments)
5. Fuel flow rate measuring means/Fuel flow meter (first to sixth embodiments)

6. Engine load measuring means/Engine load sensor (third to sixth embodiments)
7. Onboard storage means/Onboard database (third to sixth embodiments)
8. LAN repeater (third to sixth embodiments)
9. Interface (fifth and sixth embodiments)
10. Control means/Control unit (first and second embodiments), or Onboard control means (fifth and sixth embodiments)
11. Database (first and second embodiments), or Control unit (fifth and sixth embodiments)
12. Personal computer (first and second embodiments), or Display means/Monitor (fifth and sixth embodiments)
13. Input means/Keyboard (first and second embodiments)
14. Printer (first and second embodiments)
15. Memory card (first to sixth embodiments)
20. Control means/Control unit (third and fourth embodiments), or Control means/Personal computer for fuel efficiency data analysis (fifth and sixth embodiments)
22. Printer (third to sixth embodiments)
24. Input means/Keyboard (third to sixth embodiments)

The invention claimed is:

1. A fuel consumption evaluation system comprising:
engine speed measuring means which measures engine speed of a truck;
accelerator opening degree measuring means which measures an accelerator opening degree;
vehicle velocity measuring means which measures vehicle velocity;
fuel flow rate measuring means which measures a fuel flow rate; and
control means which evaluates fuel consumption of the truck from measured engine speed, accelerator opening degree, vehicle velocity and fuel flow rate, characterized in that the control means:
has storage means,
divides a run from start to stop into a plurality of phases,
sets fuel consumption-related parameters for each of the plural phases,
determines fuel consumption for each of the plural phases based on correlation between the parameters and fuel consumption, and
makes an evaluation based on the determined fuel consumption.

2. The fuel consumption evaluation system according to claim 1, wherein the plural phases include:
a phase in which the accelerator opening degree is increased from a relatively low velocity and vehicle velocity or average moving vehicle velocity increases;
a phase in which the accelerator opening degree is decreased;
a phase in which the accelerator opening degree is relatively small and engine speed is relatively low; and
a steady running phase which is different from the above three phases.

3. The fuel consumption evaluation system according to claim 2, wherein:
for the phase in which the accelerator opening degree is increased from a relatively low velocity and vehicle velocity or average moving vehicle velocity increases, the parameters are engine speed in gear shift and accelerator opening degree;
for the phase in which the accelerator opening degree is decreased, the parameter is the ratio of distance traveled with the accelerator and brake off to the sum of distance traveled with the accelerator and brake off and distance traveled with the brake on;
for the phase in which the accelerator opening degree is relatively small and engine speed is relatively low, the parameter is vehicle velocity; and
for the steady running phase which is different from the above three phases, the parameter is engine speed.

4. The fuel consumption evaluation system according to claim 1, wherein the steady running phase is divided into a high speed running phase in which a given distance or more is traveled at a vehicle velocity above a prescribed velocity and other phases and the parameters for the high speed running phase are engine speed, vehicle velocity, and equivalent to fuel consumed by acceleration before or after braking.

5. The fuel consumption evaluation system according to claim 1, wherein the plural phases are classified into a phase in which distance from start to stop is shorter than a predetermined distance and other phases and in the phase in which distance from start to stop is shorter than a predetermined distance, the parameter is squared vehicle velocity divided by distance traveled.

6. The fuel consumption evaluation system according to claim 1, wherein correlation between the parameters and fuel consumption is statistically calculated from data stored in the storage means for the phase in which the accelerator opening degree is increased from a relatively low velocity and vehicle velocity or average moving vehicle velocity increases, the phase in which the accelerator opening degree is relatively small and engine speed is relatively low, and the steady running phase.

7. The fuel consumption evaluation system according to claim 1, wherein, for the phase in which the accelerator opening degree is decreased, fuel consumption is determined according to distance traveled in the phase, distance traveled with the accelerator and brake off, and fuel efficiency.

8. The fuel consumption evaluation system according to claim 1, wherein the control means compares determined fuel consumption against average obtained from data stored in the storage means.

9. The fuel consumption evaluation system according to claim 1, wherein the control means compares determined fuel consumption against target.

10. The fuel consumption evaluation system according to claim 1, wherein data for a running condition in which determined fuel consumption may be inaccurate is ignored.

11. The fuel consumption evaluation system according claim 1, wherein output means are provided and determined fuel consumption and evaluation based on comparison against average or target are outputted.

12. A fuel consumption evaluation system comprising:
engine speed measuring means which measures engine speed of a vehicle;
accelerator opening degree measuring means which measures an accelerator opening degree;
vehicle velocity measuring means which measures vehicle velocity;
fuel flow rate measuring means which measures a fuel flow rate;
engine load measuring means which measures engine load; and
control means which calculates fuel consumption of the vehicle and vehicle mass from measured engine speed, accelerator opening degree, vehicle velocity, fuel flow rate and engine load, characterized in that the control means:
has storage means,
divides a run from start to stop into a plurality of phases,
sets fuel consumption-related parameters for each of the plural phases, calculates fuel consumption rate for actual driving against average driving and fuel consumption rate for target driving against average driving based on correlation between the parameters and fuel consumption rate against average driving, and makes an evaluation based on the calculated fuel consumption rates.

13. The fuel consumption evaluation system according to claim 12, wherein the plural phases include:
a phase in which the accelerator opening degree is increased from a relatively low velocity and vehicle velocity or average moving vehicle velocity increases;
a phase in which the accelerator opening degree is decreased;
a phase in which the accelerator opening degree is relatively small and engine speed is relatively low; and
a steady running phase which is different from the above three phases.

14. The fuel consumption evaluation system according to claim 13, wherein:
for the phase in which the accelerator opening degree is increased from a relatively low velocity and vehicle velocity or average moving vehicle velocity increases, the parameters are engine speed in gear shift and accelerator opening degree;
for the phase in which the accelerator opening degree is decreased, the parameter is the ratio of distance traveled with the accelerator and brake off to the sum of distance traveled with the accelerator and brake off and distance traveled with the brake on;
for the phase in which the accelerator opening degree is relatively small and engine speed is relatively low, the parameter is vehicle velocity; and
for the steady running phase which is different from the above three phases, the parameter is engine speed.

15. The fuel consumption evaluation system according to claim 12, wherein the steady running phase is divided into a high speed running phase in which a given distance or more is traveled at a vehicle velocity above a prescribed velocity and other phases for the purpose of data collection.

16. The fuel consumption evaluation system according to claim 12, wherein in calculating fuel consumption for actual driving, data from the fuel flow rate measuring means is integrated for each of the plural phases and all the integrated values for the phases from start to stop are totaled.

17. The fuel consumption evaluation system according to claim 12, wherein for all the parameters, actual vehicle total mass is calculated for measured vehicle velocity and the vehicle's specification and an evaluation of fuel consumption is made in consideration of the vehicle total mass.

18. The fuel consumption evaluation system according to claim 12, wherein output means are provided and fuel consumption rate for actual driving against average driving and fuel consumption rate for target driving against average driving are calculated and an evaluation based on the calculated fuel consumption rates is outputted.

19. A fuel consumption evaluation system comprising:
engine speed measuring means which measures engine speed of a vehicle;
accelerator opening degree measuring means which measures an accelerator opening degree;
vehicle velocity measuring means which measures vehicle velocity;
fuel flow rate measuring means which measures a fuel flow rate;
engine load measuring means which measures engine load; and storage means which stores data on measured engine speed, accelerator opening degree, vehicle velocity, fuel flow rate and engine load;
control means which calculates fuel consumption of the vehicle and vehicle mass from the various data; and
display means which is installed in the vehicle, characterized in that the control means:
divides a run from start to stop into a plurality of phases,
sets fuel consumption-related parameters for each of the plural phases,
calculates fuel consumption rate for actual driving against average driving and fuel consumption rate for target driving against average driving based on correlation between the parameters and fuel consumption rates against average driving,
makes an evaluation based on the calculated fuel consumption rates, and
displays the evaluation result on the display means.

20. The fuel consumption evaluation system according to claim 19, wherein the plural phases include:
a phase in which the accelerator opening degree is increased from a relatively low velocity and vehicle velocity or average moving vehicle velocity increases;
a phase in which the accelerator opening degree is decreased;
a phase in which the, accelerator opening degree is relatively small and engine speed is relatively low; and
a steady running phase which is different from the above three phases.

21. The fuel consumption evaluation system according to claim 20, wherein:
for the phase in which the accelerator opening degree is increased from a relatively low velocity and vehicle velocity or average moving vehicle velocity increases, the parameters are engine speed in gear shift and accelerator opening degree;
for the phase in which the accelerator opening degree is decreased, the parameter is the ratio of distance traveled with the accelerator and brake off to the sum of distance traveled with the accelerator and brake off and distance traveled with the brake on;
for the phase in which the accelerator opening degree is relatively small and engine speed is relatively low, the parameter is vehicle velocity; and
for the steady running phase which is different from the above three phases, the parameter is engine speed.

22. The fuel consumption evaluation system according to claim 19, wherein the steady running phase is divided into a high speed running phase in which a given distance or more is traveled at a vehicle velocity above a prescribed velocity and other phases for the purpose of data collection.

23. The fuel consumption evaluation system according to claim 19, wherein in calculating fuel consumption for actual driving, data from the fuel flow rate measuring means is integrated for each of the plural phases and all the integrated values for the phases from start to stop are totaled.

24. The fuel consumption evaluation system according to claim 19, wherein for all the parameters, actual vehicle total mass is calculated for measured vehicle velocity and the vehicle's specification and an evaluation of fuel consumption is made in consideration of the vehicle total mass.

25. The fuel consumption evaluation system according to claim 19, wherein output means are provided and fuel consumption rate for actual driving against average driving and fuel consumption rate for target driving against average driving are calculated and an evaluation based on the calculated fuel consumption rates is outputted.

* * * * *